United States Patent
Legaignoux et al.

(10) Patent No.: US 8,622,655 B2
(45) Date of Patent: Jan. 7, 2014

(54) PIPE-LAYING VESSEL AND METHOD OF LAYING A PIPELINE

(75) Inventors: Herve Jean Francois Legaignoux, Istres (FR); Michel Pierre Baylot, Marseilles (FR); Emmanuel Huot, Saint Martin de Nigelles (FR); Kimon Tullio Ardavanis, Sanremo (IT)

(73) Assignee: Saipem S.p.A., San Donato Milanese (IT)

( * ) Notice: Subject to any disclaimer, the term of this patent is extended or adjusted under 35 U.S.C. 154(b) by 200 days.

(21) Appl. No.: 13/000,116

(22) PCT Filed: Jun. 19, 2009
(Under 37 CFR 1.47)

(86) PCT No.: PCT/EP2009/057698
§ 371 (c)(1),
(2), (4) Date: May 24, 2011

(87) PCT Pub. No.: WO2009/153352
PCT Pub. Date: Dec. 23, 2009

(65) Prior Publication Data
US 2012/0093585 A1 Apr. 19, 2012

(30) Foreign Application Priority Data

Jun. 20, 2008 (GB) .................................. 0811437.3

(51) Int. Cl.
*F16L 1/12* (2006.01)
(52) U.S. Cl.
USPC .......................... 405/166; 405/158; 405/168.4
(58) Field of Classification Search
USPC ........ 405/154.1, 158, 166, 168.4, 168.1, 169, 405/170; 114/244, 258, 259, 264, 265
See application file for complete search history.

(56) References Cited

U.S. PATENT DOCUMENTS

| 3,581,506 A | 6/1971 | Howard |
| 3,680,322 A | 8/1972 | Nolan et al. |

(Continued)

FOREIGN PATENT DOCUMENTS

| EP | 1 696 163 A1 | 8/2006 |
| WO | WO 2005/085692 A1 | 9/2005 |

(Continued)

OTHER PUBLICATIONS http://web.archive.org/web/20071201133533/http://www.yourdictionary.com/adjacent; May 3, 2007.*

(Continued)

*Primary Examiner* — Sean Andrish
(74) *Attorney, Agent, or Firm* — Buchanan Ingersoll & Rooney PC

(57) ABSTRACT

A pipe-laying vessel is provided, including a tower extending upwardly from the vessel, a pipe loading arm for raising a length of pipe from the deck to a position aligned with the tower. The pipe-laying vessel may also include a support assembly for supporting a bulky item to be accommodated along the pipeline, the support assembly including a frame pivotable between a first load receiving position and a second tilted position in which it extends approximately parallel to the tower, and drive means for pivoting the tiltable frame between its first and second positions. The pipe-laying vessel may alternatively or additionally include a welding assembly station cabin in the region of a lower portion of the tower, a movable support assembly for supporting a bulky item to be accommodated along the pipeline, the movable support assembly being disposed on top of the cabin.

24 Claims, 23 Drawing Sheets

(56) References Cited

U.S. PATENT DOCUMENTS

| | | | |
|---|---|---|---|
| 3,860,122 | A | 1/1975 | Cernosek |
| 4,347,029 | A | 8/1982 | Latimer et al. |
| 4,480,943 | A | 11/1984 | Leuenberger |
| 4,486,123 | A | 12/1984 | Koch et al. |
| 4,865,359 | A | 9/1989 | Roberts |
| 5,421,675 | A | 6/1995 | Brown et al. |
| 5,464,307 | A | 11/1995 | Wilkins |
| 5,533,834 | A | 7/1996 | Recalde |
| 5,823,712 | A | 10/1998 | Kalkman et al. |
| 6,273,643 | B1 | 8/2001 | Baugh |
| 6,352,388 | B1 | 3/2002 | Seguin |
| 6,361,250 | B1 | 3/2002 | de Varax |
| 6,398,457 | B2 | 6/2002 | Baugh |
| 6,524,030 | B1 | 2/2003 | Giovannini et al. |
| 6,592,297 | B2 | 7/2003 | Frijns et al. |
| 6,729,803 | B1 | 5/2004 | Baylot |
| 6,796,742 | B1 | 9/2004 | Roger et al. |
| 6,910,848 | B1 | 6/2005 | Baugh |
| 7,189,028 | B1 | 3/2007 | Signaroldi et al. |
| 7,878,735 | B2 | 2/2011 | Roodenburg et al. |
| 8,251,613 | B2 | 8/2012 | Narold et al. |
| 8,292,544 | B2 | 10/2012 | Ardavanis et al. |
| 2002/0009333 | A1 | 1/2002 | Willis et al. |
| 2003/0219313 | A1 | 11/2003 | Giovannini et al. |
| 2007/0189857 | A1 | 8/2007 | Vergouw et al. |
| 2007/0258772 | A1 | 11/2007 | Bursaux et al. |
| 2009/0087267 | A1 | 4/2009 | Narold et al. |
| 2009/0324339 | A1 | 12/2009 | Roodenburg et al. |

FOREIGN PATENT DOCUMENTS

| | | |
|---|---|---|
| WO | WO 2006/054891 A1 | 5/2006 |
| WO | WO 2007/108673 A1 | 9/2007 |
| WO | WO 2007/120035 A1 | 10/2007 |
| WO | 2008041837 A1 | 4/2008 |

OTHER PUBLICATIONS

International Search Report (PCT/ISA/210) issued on Mar. 8, 2010, by European Patent Office as the International Searching Authority for International Application No. PCT/EP2009/057698.

Written Opinion (PCT/ISA/237) issued on Mar. 8, 2010, by European Patent Office as the International Searching Authority for International Application No. PCT/EP2009/057698.

Office Action issued on Nov. 20, 2012 by the USPTO in corresponding U.S. Appl. No. 13/000,150.

* cited by examiner

PIPE-LAYING VESSEL AND METHOD OF LAYING A PIPELINE

TECHNICAL FIELD

This invention relates to a pipe-laying vessel and to a method of laying a pipeline. Such a vessel and method is of particular use in the offshore industry relating to oil and gas production.

BACKGROUND OF THE INVENTION

One of the tasks that is carried out by certain vessels in the offshore industry is that of laying pipelines, either by S-laying or by J-laying. J-laying, in which the pipeline is lowered down an inclined or vertical tower and curves round in a single direction to become approximately horizontal along the seabed, is used primarily for laying pipeline in deep water (that is typically deeper than 1,000 m). Examples of J-laying arrangements are shown in U.S. Pat. No. 6,524,030, U.S. Pat. No. 6,592,297, WO 2006/054891, WO 2005/085692 and U.S. Pat. No. 6,796,742.

SUMMARY OF INVENTION

It is an object of the invention to provide an improved pipe-laying vessel and an improved method of laying a pipeline.

According to a first aspect of the invention there is provided a pipe-laying vessel including a tower extending upwardly from the vessel, a pipe loading arm for raising a length of pipe from the deck to a position aligned with the tower, a support assembly for supporting a bulky item to be accommodated along the pipeline, the support assembly including a frame pivotable between a first load receiving position and a second tilted position in which it extends approximately parallel to the tower, and drive means for pivoting the tiltable frame between its first and second positions.

By providing a tiltable frame to receive the bulky item, the streamlined introduction of the bulky item into the pipeline is facilitated with only modest amounts of further equipment required.

It should be understood that the pipe loading arm and the support assembly for supporting the bulky item are separate items of equipment.

Preferably the tiltable frame extends approximately horizontally when it is in the first load receiving position. In that case loading of the bulky item onto the tiltable frame, either by lowering it from above or by skidding it sideways onto the frame, is facilitated.

The support assembly is preferably a movable support assembly and may include a movable support on which the tiltable frame is pivotally mounted. The movable support assembly is preferably movable towards and away from the tower. That allows the bulky item to be loaded onto the tiltable frame and, after loading, moved towards the tower.

Preferably the vessel further includes a welding assembly station cabin in the region of a lower portion of the tower. The support assembly is preferably disposed on top of the cabin. The cabin is preferably an enclosed space which may provide weather protection but it may also be an open frame construction. In the case where it defines an enclosed space it preferably defines a single compartment, but it may alternatively define two or more smaller compartments.

Preferably at least part of the support assembly rests on and is supported by the cabin. That enables a more compact and lightweight arrangement to be provided.

Preferably the cabin is movable towards and away from the tower. In that case, the cabin may be interposed along the pipe-laying path (firing line) during welding of a new pipe length (also referred to herein as a pipe string) to the pipeline but may be retracted to a position clear of the pipe-laying path at other times.

The movable support assembly may be movable in unison with the cabin and/or it may be movable independently of the cabin. In an embodiment of the invention described below the assembly is movable both in unison with the cabin and independently of the cabin.

Preferably the cabin and/or the movable support assembly are mounted on rails. More preferably, the cabin and the movable support assembly are mounted at least partly on a common set of rails. In an embodiment of the invention described below, the cabin and one end of the movable support assembly are mounted on a common set of rails and the other end of the movable support assembly is mounted on rails on the roof of the cabin.

Preferably the movable support comprises a first frame, the tiltable frame defining a second frame pivotally mounted on the first frame and pivotable between the first load receiving position and the second tilted position.

The drive means for pivoting the tiltable frame may take any of a wide variety of forms including a rack and pinion drive and a winch and rope drive, but in an embodiment described below the drive means comprises one or more hydraulic cylinders (jacks).

The invention may be applied to a wide range of pipe-laying systems including ones with a fixed tower and ones where the inclination of the tower can be varied, for example systems where the inclination of the tower can be varied by an angle of more than 30 degrees. Also the invention may be applied to a tower in which there is a travelling clamp assembly which may for example be lowered down the tower to lower the pipeline into the sea, or to a tower with one or more tensioners fixed on the tower for lowering the pipeline at a controlled rate. A fixed clamp assembly, also known as a hang off clamp assembly, is preferably provided in the region of a lower portion of the tower fixed to the vessel or to the tower. In an embodiment of the invention described below, the tower is pivotally mounted and is able to operate over a range of angles to the horizontal; in the particular example described the tower can operate at angles in the range of 45 degrees to 96 degrees to the horizontal. In the embodiment described a travelling clamp assembly is mounted for movement along the tower and a fixed clamp assembly is located in the region of a lower portion of the tower and in the particular example described is mounted on the tower.

In a preferred arrangement, the pipe loading arm is raised to a position along the tower spaced away from the centre of the tower. At that stage the pipe length carried by the pipe loading arm is preferably well clear of the pipe-laying path (firing line). The pipe string carried by the pipe loading arm can then be swung around the arm to a position along the centre of the tower, that is equidistant from the opposite sides of the tower.

A stinger or similar structure may be provided below the tower. The stinger may control the curvature of the pipeline as it leaves the tower. The stinger may be retractable.

The axis of pivoting of the tiltable frame is preferably in the region of the tower. In an embodiment of the invention described below, the axis of pivoting is in the region of the end of the first frame nearer to the tower. Preferably the location of the axis of pivoting is adjustable, for example to suit different inclinations of the tower and/or to accommodate different shapes of bulky item.

The provision of a movable support assembly for a bulky item on top of the cabin is itself a special and inventive feature. Accordingly, in a second aspect, the invention provides a pipe-laying vessel including a tower extending upwardly from the vessel, a pipe loading arm for raising a length of pipe from the deck to a position aligned with the tower, a welding assembly station cabin in the region of a lower portion of the tower, a movable support assembly for supporting a bulky item to be accommodated along the pipeline, the movable support assembly being disposed on top of the cabin.

By providing the movable support assembly on top of the cabin, the streamlined introduction of the bulky item into the pipeline is again facilitated with only modest amounts of further equipment required.

According to a third aspect of the invention, there is provided a pipe-laying vessel including a tower extending upwardly from the vessel, a pipe loading arm for raising a length of pipe from the deck to a position aligned with the tower, wherein a rope and winch system is provided for moving the pipe loading arm to raise the length of pipe, the rope and winch system including two ropes operating in parallel whereby movement of the loading arm can still be effected by the system in the event that one of the two ropes is inoperative.

The operation of the loading arm is a key part of the pipe-laying procedure and if interrupted, can prevent any pipe-laying. By providing a dual rope system, where even if one rope is severed, the loading arm can still be operated, although possibly at reduced speed, the reliability of pipe-laying is significantly improved.

The pipe loading arm is preferably pivotally mounted about a pivot in the region of the bottom of the tower for allowing the loading arm to pivot between a lower, substantially horizontal position and a raised position in which the loading arm is substantially parallel to the longitudinal axis of the tower.

The two ropes preferably follow adjacent paths. They may be wound on the same winch drum or adjacent winch drums driven by the same drive.

Each rope may include an extensible element along its length. Such an element facilitates an equal sharing of loads between the two ropes during normal operation when both ropes are operative.

A vessel of any of the kinds defined above can be designed to operate at considerable depths with correspondingly high tension loads. For example, the equipment on the vessel is preferably able to handle pipe tension loads over 1,000 tonnes and more preferably over 1,500 tonnes, and preferably loads of 2,000 tonnes.

According to the first aspect of the invention, there is provided a method of laying a pipeline from a pipe-laying vessel, the method comprising the following steps:

providing a vessel with an upwardly extending tower,
raising a length of pipe on a pipe loading arm from a deck of the vessel to a position aligned with the tower,
welding the length of pipe to the end of a pipeline suspended from the vessel,
lowering the pipeline with the length of pipe welded thereto,
resting a bulky item to be added to the pipeline on a tiltable frame,
tilting the frame to a position extending approximately parallel to the tower,
transferring the support for the bulky item from the tiltable frame to one or more devices in the tower, and
connecting the bulky item to the pipeline suspended from the vessel.

The tiltable frame preferably extends approximately horizontally when it receives the bulky item.

The welding of the length of pipe to the end of the pipeline is preferably carried out in a welding assembly station cabin disposed in the region of a lower portion of the tower. In that case, the tiltable frame is preferably tilted from a position overlying the top of the cabin to the position extending approximately parallel to the tower.

The method preferably further includes the step of moving the cabin towards the tower. The cabin and the support assembly are preferably moved towards the tower in unison. More preferably the support assembly is moved towards the tower and the cabin in a first step and is moved in unison with the cabin towards the tower in a subsequent step.

According to the second aspect of the invention, there is provided a method of laying a pipeline from a pipe-laying vessel, the method comprising the following steps:

providing a vessel with an upwardly extending tower,
raising a length of pipe on a pipe loading arm from a deck of the vessel to a position aligned with the tower,
welding the length of pipe to the end of a pipeline suspended from the vessel, the welding being carried out in a welding assembly station cabin disposed in the region of a lower portion of the tower,
lowering the pipeline with the length of pipe welded thereto,
resting a bulky item to be added to the pipeline on a movable support assembly disposed on top of the cabin,
moving the movable support assembly towards the tower,
transferring the bulky item from the movable support assembly into the tower, and
connecting the bulky item to the pipeline suspended from the vessel.

According to a fourth aspect of the invention, there is provided a pipe-laying vessel including a tower extending upwardly from the vessel, a pipe loading arm for raising a length of pipe from the deck to a position aligned with the tower, a travelling clamp assembly mounted for movement along the tower, a fixed clamp assembly located in the region of a lower portion of the tower, wherein the travelling clamp assembly and/or the fixed clamp assembly includes both a friction clamp and a collar clamp, each of the friction clamp and the collar clamp being movable between an operative position, in which it is adjustable between a clamping and a released position, and an inoperative position.

By providing both a friction clamp and a collar clamp, each movable between operative and inoperative positions, an especially versatile clamping arrangement can be provided.

Preferably each of the friction clamp and the collar clamp is independently movable between the operative and inoperative positions. This adds to the versatility of the clamping arrangement. The friction clamp and the collar clamp are preferably mounted for pivotal movement between operative and inoperative positions.

It is also within the scope of the fourth aspect of the invention for the travelling clamp assembly to be replaced by, for example, tensioners. In a case where there is no travelling clamp assembly, it is the fixed clamp assembly that includes both a friction clamp and a collar clamp.

According to a fifth aspect of the invention, there is provided a pipe-laying vessel including a tower extending upwardly from the vessel, a pipe loading arm for raising a length of pipe from the deck to a position aligned with the tower; a travelling clamp assembly mounted for movement along the tower, wherein the travelling clamp assembly includes both a line-up clamp and a pipeline tension bearing clamp.

In use, the travelling clamp assembly can be lowered down the tower to lower the pipeline into the sea.

The pipeline tension bearing clamp is preferably a friction clamp but it may take other forms such as, for example, a collar clamp. Similarly, the line-up clamp is preferably a friction clamp but it may take other forms such as, for example, a collar clamp.

The line-up clamp may be mounted on the travelling clamp assembly for movement between an operative and an inoperative position. The movement is preferably pivotal movement.

According to a sixth aspect of the invention, there is provided a pipe-laying vessel including a tower extending upwardly from the vessel, a pipe loading arm for raising a length of pipe from the deck to a position aligned with the tower, and three or more line-up clamps spaced along the tower for receiving the length of pipe from the loading arm.

By providing three line-up clamps along the tower it is possible to align especially well a length of pipe that is to be joined to a pipeline.

Preferably one of the line-up clamps is mounted on a travelling clamp assembly mounted for movement along the tower. In such a case, the position of one line-up clamp varies but, at the stage when a length of pipe is being aligned prior to joining to a pipeline, it will be in a high position on the tower above the other line-up clamps. The high position of the clamp helps to line up the top of the length of pipe for an internal line-up clamp that may be lowered into the pipe. Preferably the line-up clamp is mounted on the travelling clamp assembly in the region of the top of the assembly and/or above the pipeline tension bearing clamp.

Preferably the line-up clamp mounted on the travelling clamp assembly is able to support the tension load of the length of pipe when it is clamped to the pipe.

At least one of the line-up clamps, preferably each of the line-up clamps below the line-up clamp mounted on the travelling clamp assembly, includes rollers spaced around the line-up clamp for allowing longitudinal movement of the length of pipe relative to the clamp when it is clamped to the pipe.

At least two of the line-up clamps are preferably able to be adjusted in a plane substantially perpendicular to the tower in both orthogonal directions. That ensures that the desired lateral positioning within the tower of the length of pipe can be achieved.

A vessel of any of the kinds defined above can be designed to operate at considerable depths with correspondingly high tension loads. For example, the equipment on the vessel is preferably able to handle pipe tension loads over 1,000 tonnes and more preferably over 1,500 tonnes, and preferably loads of 2,000 tonnes.

While certain methods of laying a pipeline are already described above, the invention further provides a method of laying a pipeline from a pipe-laying vessel, in which the vessel is in any of the forms defined above for any of the aspects of the invention.

It should be understood that each aspect of the invention may be combined with selected features or all features of one or more of the other aspects of the invention. Indeed in an embodiment of the invention described below all the aspects of the invention are incorporated in one vessel. Similarly, it should be understood that features described only in the context of the vessel may be incorporated in corresponding features of a method of the invention and vice versa.

BRIEF DESCRIPTION OF THE DRAWINGS

By way of example an embodiment of the invention will now be described with reference to the accompanying schematic drawings, of which.

DETAILED DESCRIPTION OF EMBODIMENTS

Figure 1:
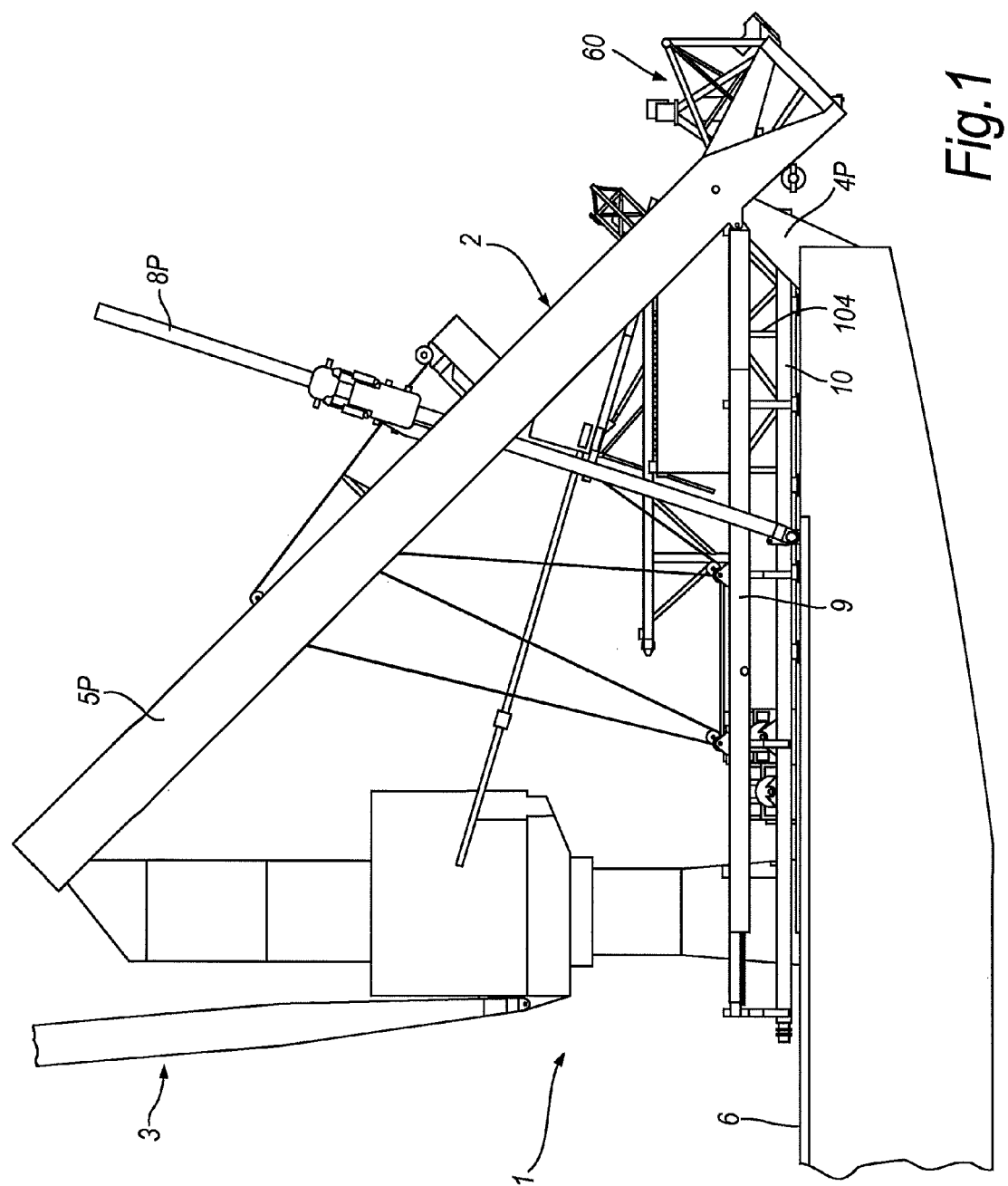
FIG. 1 is a side view from the port side of a stern portion of a pipe-laying vessel including a tower.

Referring first to FIG. 1, a pipe-laying vessel indicated generally by the reference numeral 1 is a monohull vessel which carries at its stern a pipe-laying tower indicated generally by the reference numeral 2. Also shown in FIG. 1, on the starboard side of the vessel, is a crane indicated generally by the reference numeral 3. The vessel is equipped with a propulsion system which may include a dynamic positioning system. The vessel further includes much other equipment appropriate for the operation of a pipe-laying vessel, but the description below will be limited mainly to a description of the pipe-laying apparatus and, especially, special features of that apparatus.

Figure 2:
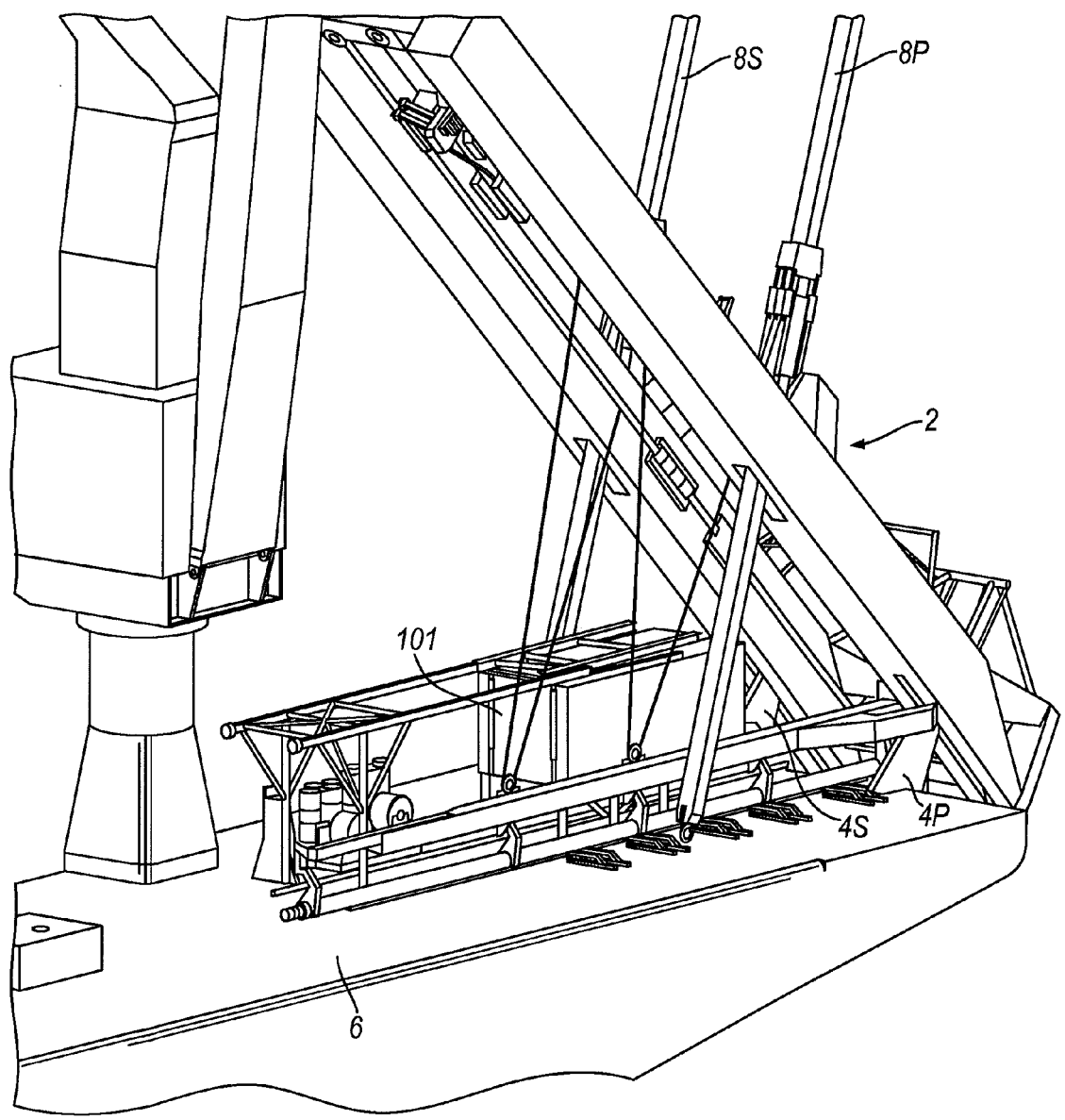
FIG. 2 is a perspective view, from the port side and from the bow end, of the stern of the vessel shown in FIG. 1.

Referring also to FIG. 2, the pipe-laying tower 2 is pivotally mounted in a central position, for pivoting movement about a horizontal axis perpendicular to the longitudinal axis of the vessel, on two mounting arms 4P and 4S which project upwardly and rearwardly from the main deck at the stern of the vessel 1. In this illustrated example of the invention, the tower 2 is able to lay pipe when pivoted at an angle of about 45 degrees to the horizontal, as shown in FIG. 2, and when at steeper angles including the vertical and extending to a position where the angle is more than 90 degrees (for example, 96 degrees) so that the top of the tower projects outwardly beyond the stern of the vessel. As will be understood, the tower 2 is used for J-laying of a pipeline.

The vessel 1 is able to lay rigid pipeline that may be supplied to the vessel in straight lengths. Such lengths of pipeline may be welded together in twos, threes or fours on the deck 6 of the vessel to form longer lengths of pipe which may then be loaded into the tower for joining to the end of a pipeline being laid. This procedure, which is known per se is described in more detail in for example U.S. Pat. No. 6,524,030, the description of which is incorporated herein by reference. In that particular embodiment two lengths of pipe are welded together to form a double joint string and two double joint strings are subsequently welded together to form a quadruple joint string. In the drawings of this specification a quadruple joint string is shown but that is of course only one of several possible arrangements.

Figure 3:
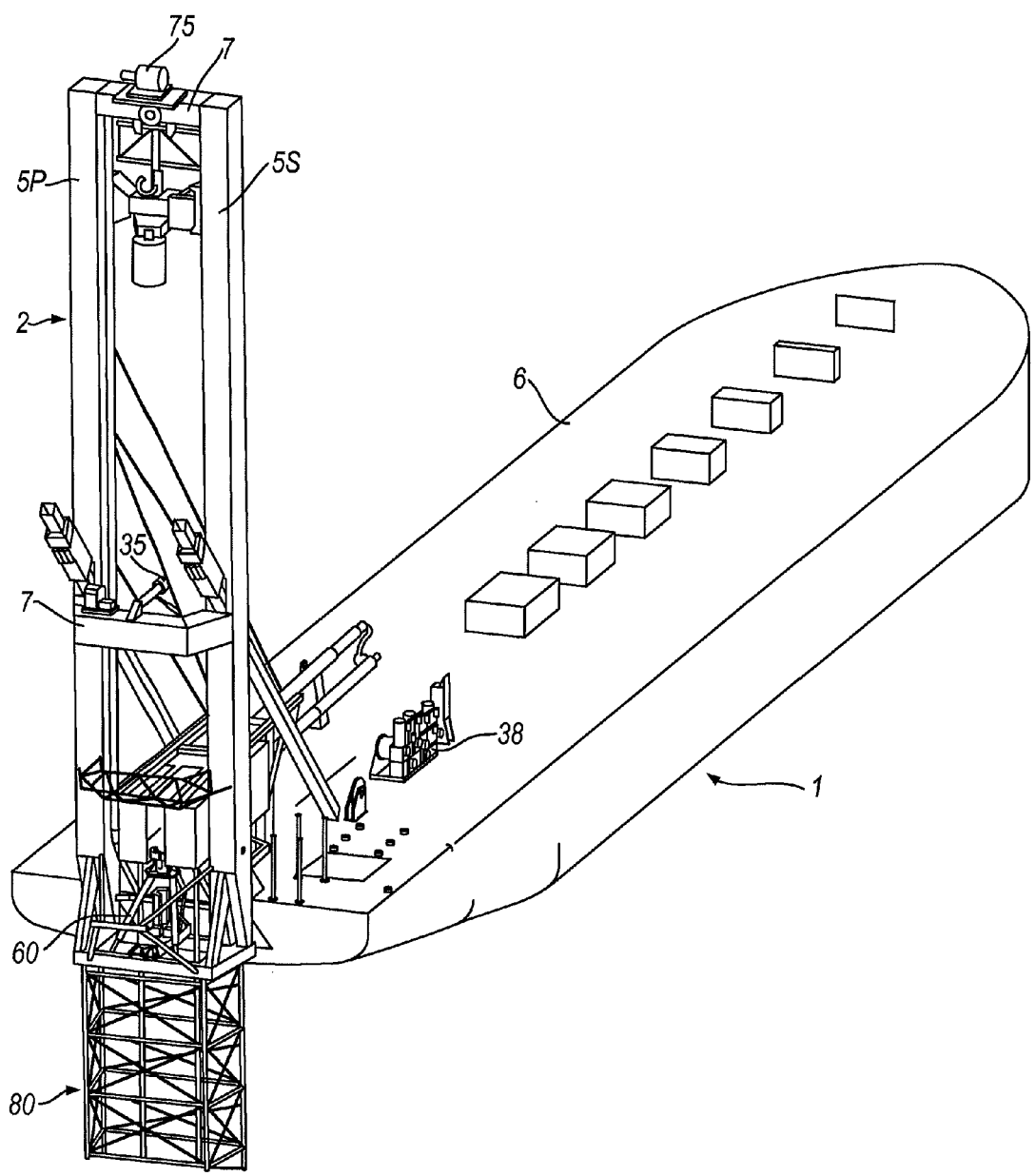
FIG. 3 is a perspective view, from the starboard side and from the stern end, of the vessel shown in FIG. 1, with a crane and certain other parts of the vessel not shown.

The tower 2 generally comprises a pair of box girders 5P, 5S interconnected by cross girders 7 at intervals, as shown in FIG. 3. The inclination of the tower is controlled by a pair of beams 8P and 8S which are pivotally mounted on the deck 6 and extend upwardly therefrom, passing through the girders 5P and 5S respectively. The girders 5P, 5S are driven up and down the beams 8P and 8S by rack and pinion drives (not shown) to tilt the tower 2. Although the tower may be intended to operate only at angles of about 45 degrees or more to the horizontal, it is able to be pivoted down to a substantially horizontal position through the beams 8P and 8S, for example to allow it to be detached from, or attached to, the vessel.

The tower 2 includes a loading arm 9 which is pivotally connected to the girder 5P of the tower 2 close to the pivotal connection of the girder to the mounting arm 4P. The loading arm can be pivoted, by a rope system described in more detail below, between a position, shown for example in FIG. 1, in which it lies horizontally over the deck 6 and a position, shown in FIG. 4, in which it lies alongside and on the inside of the girder 5P. During pipelaying a pipe string 10 is loaded onto the loading arm while the arm is in its horizontal position. As can be seen in FIG. 5, the loading arm is provided with a series of hydraulically operated clamps 11 along its length. The clamps are mounted so that they can be rotated in unison around the loading arm, to enable the pipe string 10 to be transferred to clamps mounted for movement along the tower, as will be described more fully below. At the lower end of the loading arm 9, a stopper 12 is provided; the stopper 12 provides an abutment for the end of the pipe string 10 and supports most of the weight of the pipe string 10, so that the clamps 11 do not have to accommodate that load. The clamp at the top of the loading arm 9, referenced 11A in FIG. 5, can be displaced along the length of the arm so that it engages the top portion of a pipe string 10, for different lengths of string. The loading arm can accept single, double, triple or quadruple joint strings.

Figure 5:
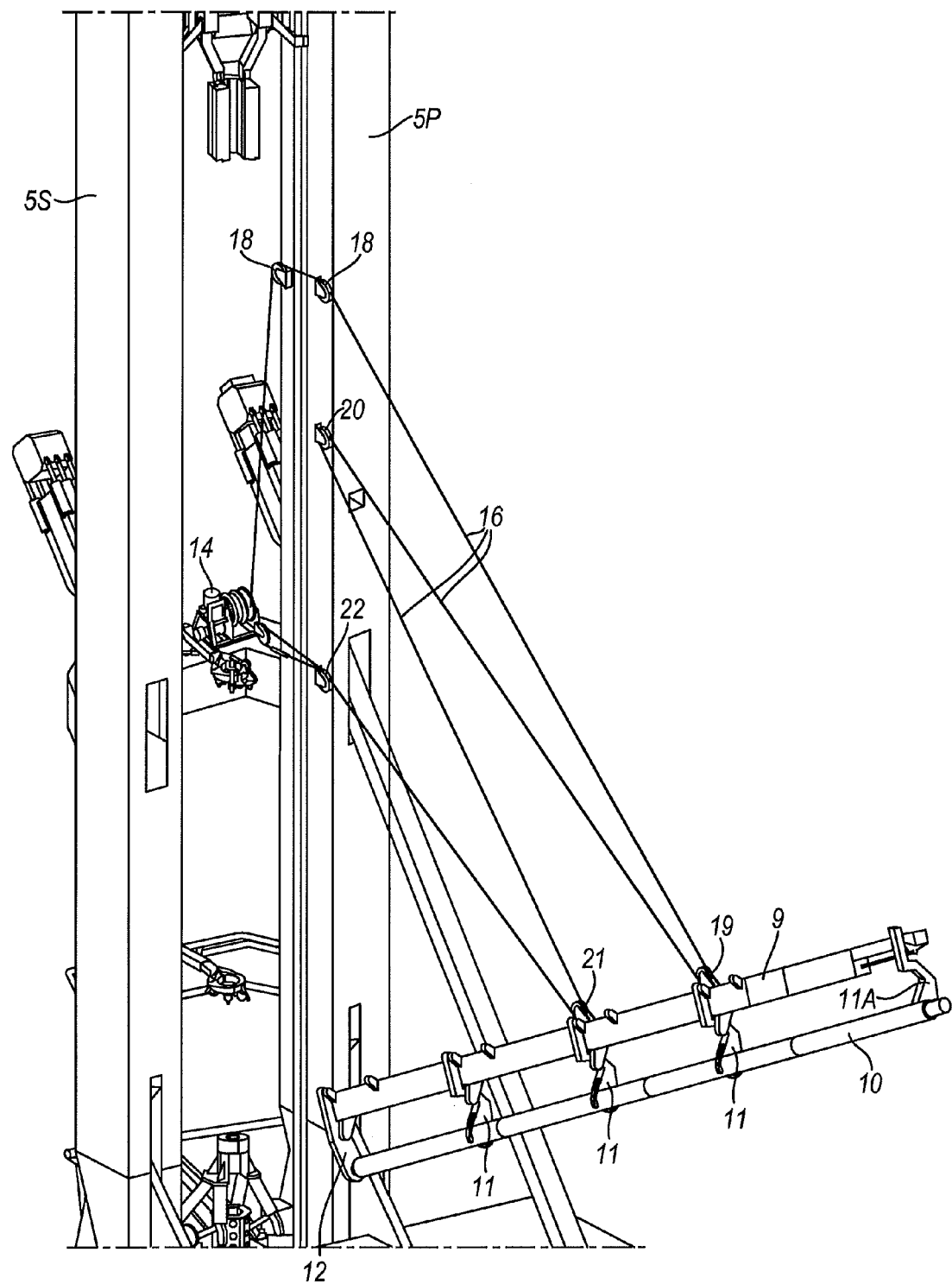
FIG. 5 is a perspective view, from the starboard side and from the bow end, of the loading arm and part of the tower with the loading arm shown in a partly raised position.
Figure 6:
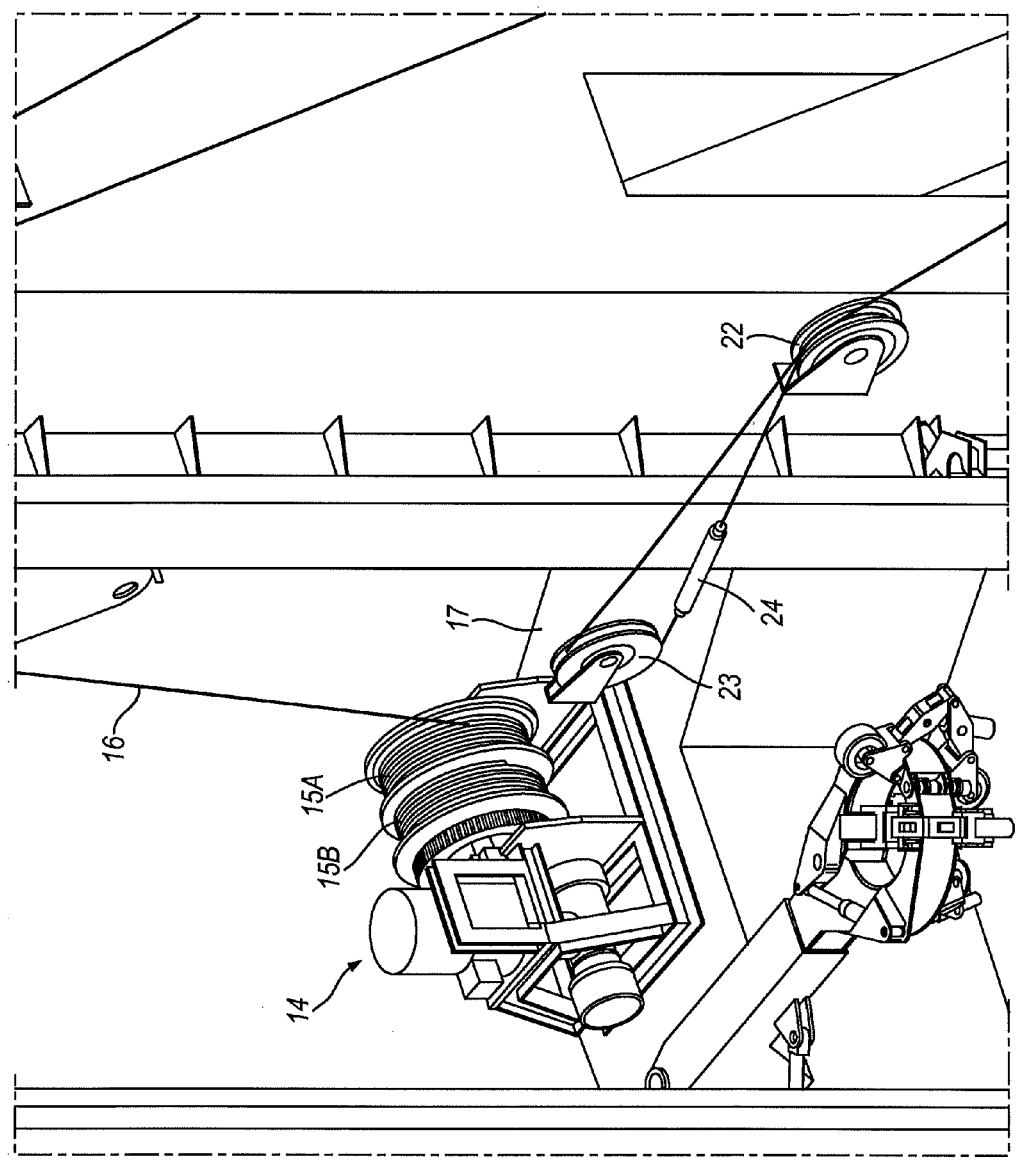
FIG. 6 is a perspective view, from the starboard side and from the bow end, of a winch and pulley system for raising and lowering the loading arm.

The loading arm 9 is raised and lowered by a winch and rope system that will now be described with reference to FIGS. 5 and 6. The system is actually a dual rope system but, for the purposes of clarity of illustration, only one rope is shown in the drawings. The system generally comprises a winch 14 having a pair of drums 15A, 15B around each of which a respective rope 16 is wound. Each rope 16 passes from the winch 14, which is mounted on a support 17 (also acting as one of the cross girders 7) fixed to the tower 2, over pulleys 18 on the girder 5P, around a pulley 19 on the loading arm 9, around a pulley 20 on the girder 5P, around a pulley 21 on the loading arm 9, over a pulley 22 on the girder 5P, around a pulley 23 on the support 17 and back to a fixture on the tower 2 to which the rope is fixed. Along the final section of the rope 16, after the pulley 23, an equalizer system 24 is provided. As already indicated, there are actually two ropes 16 which pass around their own respective pulleys following the path just described and the equalizer system 24 is connected to both of them. The presence of the equalizer system 24 ensures that the tension in each rope is approximately the same in a manner known per se.

The dual rope system is arranged such that, even if one of the ropes is severed, the other rope is able to continue to raise and lower the loading arm 9, but at a reduced speed of operation.

When the loading arm 9 is in a fully raised position it is held in position on the girder 5P by one or more clamps (not shown) to provide a secure fastening of the loading arm to the tower 2.

A pipe string 10 raised into position along the tower 2 is received by a line-up clamp system on the tower 2 that will now be described. The system generally comprises a travelling block 30 that includes a first line-up clamp 33 and a first friction clamp 34 (FIG. 7), a second line-up clamp 35 (FIGS. 8 and 9) and a third line-up clamp 36 (FIG. 10). The travelling block 30 has laterally extending arms 37 which slidably engage rails on the girders 5P, 5S to mount the travelling block for sliding movement along the tower. The travelling block 30 is moved along the tower by a rope system (not shown) in the tower that is connected to a winch 38 (FIG. 3) on the deck 6 of the vessel in a manner known per se.

While the first line-up clamp 33 is mounted for movement along the tower, the positions along the tower of the second and third line-up clamps are fixed: the second line-up clamp 35 is mounted on the support 7 in the regions of the winch 14 (FIG. 3) and the third line up clamp 36 is mounted on a support 39 (FIG. 4) lower down the tower.

Figure 4:
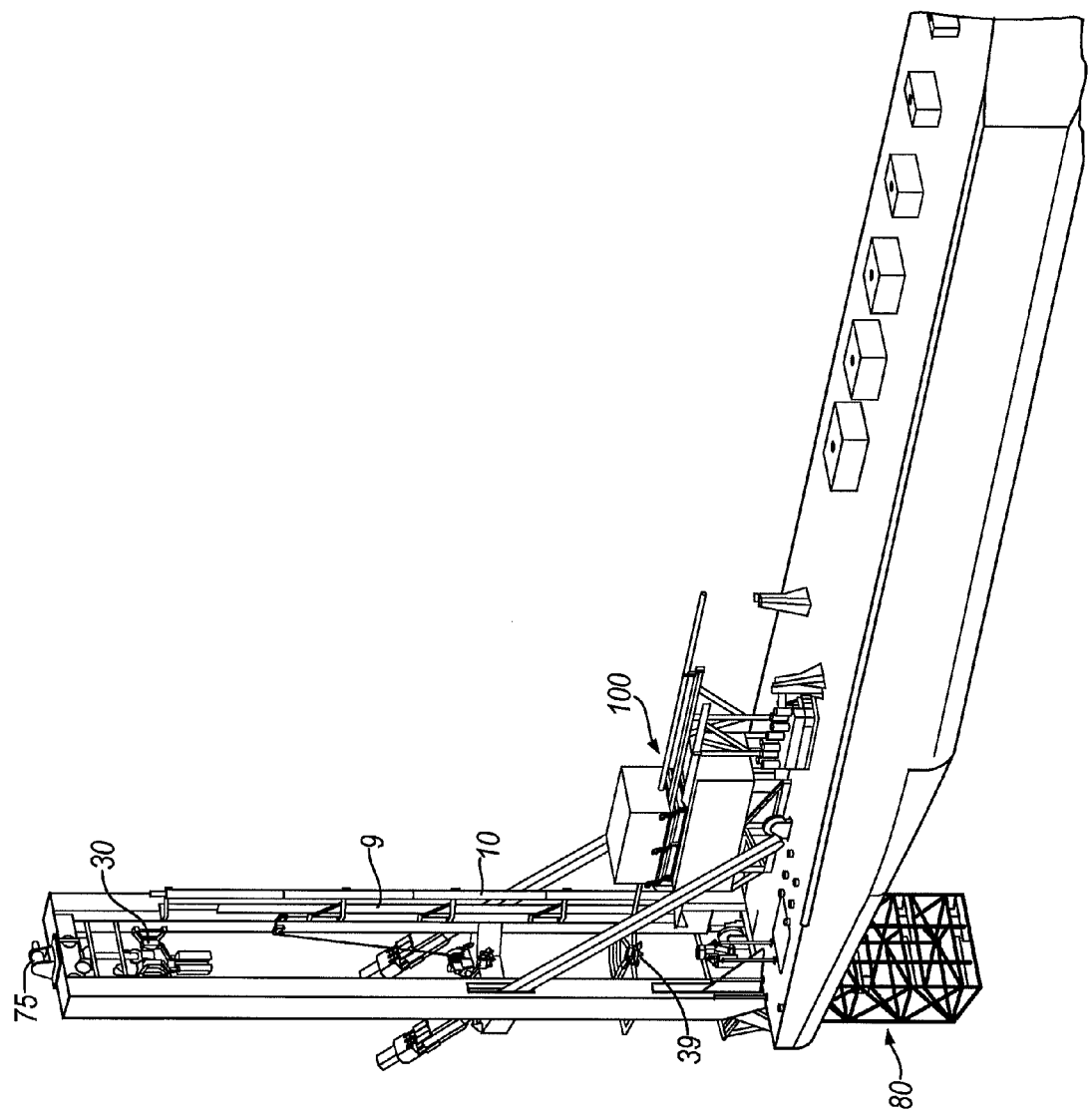
FIG. 4 is a perspective view, from the starboard side and from the bow end, of the vessel, a portion of which is shown in FIG. 1, with a crane and certain other parts of the vessel not shown and with a loading arm shown in a fully raised position.
Figure 7:
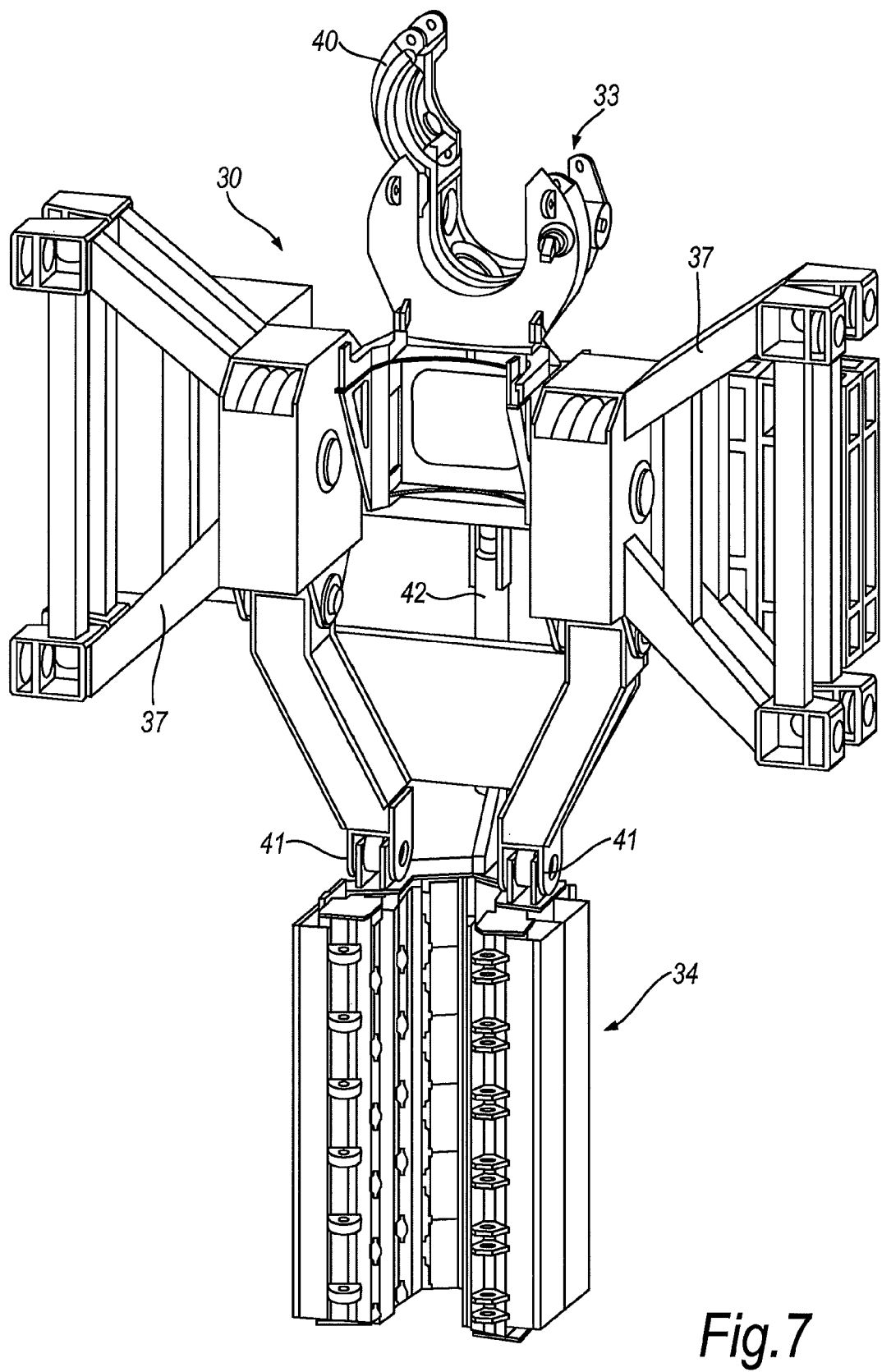
FIG. 7 is a perspective view, from the port side and from the bow end, of a travelling block including both a first friction clamp and a first line-up clamp.

When a pipe string 10 is received in the tower, the travelling block 30 is positioned towards the top of the tower in the position shown in, for example, FIG. 4. The first line-up clamp 33 is pivotally mounted on the travelling block pivotable about a horizontal axis through 90 degrees between a retracted position shown in FIG. 7 in which the clamp is disposed in a vertical plane and an operative position in which the clamp is disposed in a horizontal plane. As shown in FIG. 7, the clamp itself also has an open position, shown in FIG. 7, in which a jaw 40 of the clamp is retracted to an open position, and a closed position in which the jaw 40 is pivoted through an angle of about 90 degrees to close the central opening through the clamp.

The first friction clamp 34, which may be of a design known per se is mounted on the travelling block 30 below the line-up clamp 33 and is movable between an open position, shown in FIG. 7, and a closed position in which pads in the clamp are pressed inwardly to grip a pipe string held in the clamp. The first friction clamp 34 is pivotally mounted at pivots 41 on the travelling block and is retractable from an operative position shown in FIG. 7 to a retracted position by operation of a hydraulic cylinder 42 which causes the support on which the first friction clamp 34 is pivotally mounted to pivot rearwardly thereby moving the first friction clamp 34 rearwardly. The first friction clamp 34 is also provided internally with a slewing mechanism of a kind known per se that enables a pipe string held by it to be rotated about its longitudinal axis by ±190 degrees. The slewing mechanism is not shown in the drawings.

Figure 8:
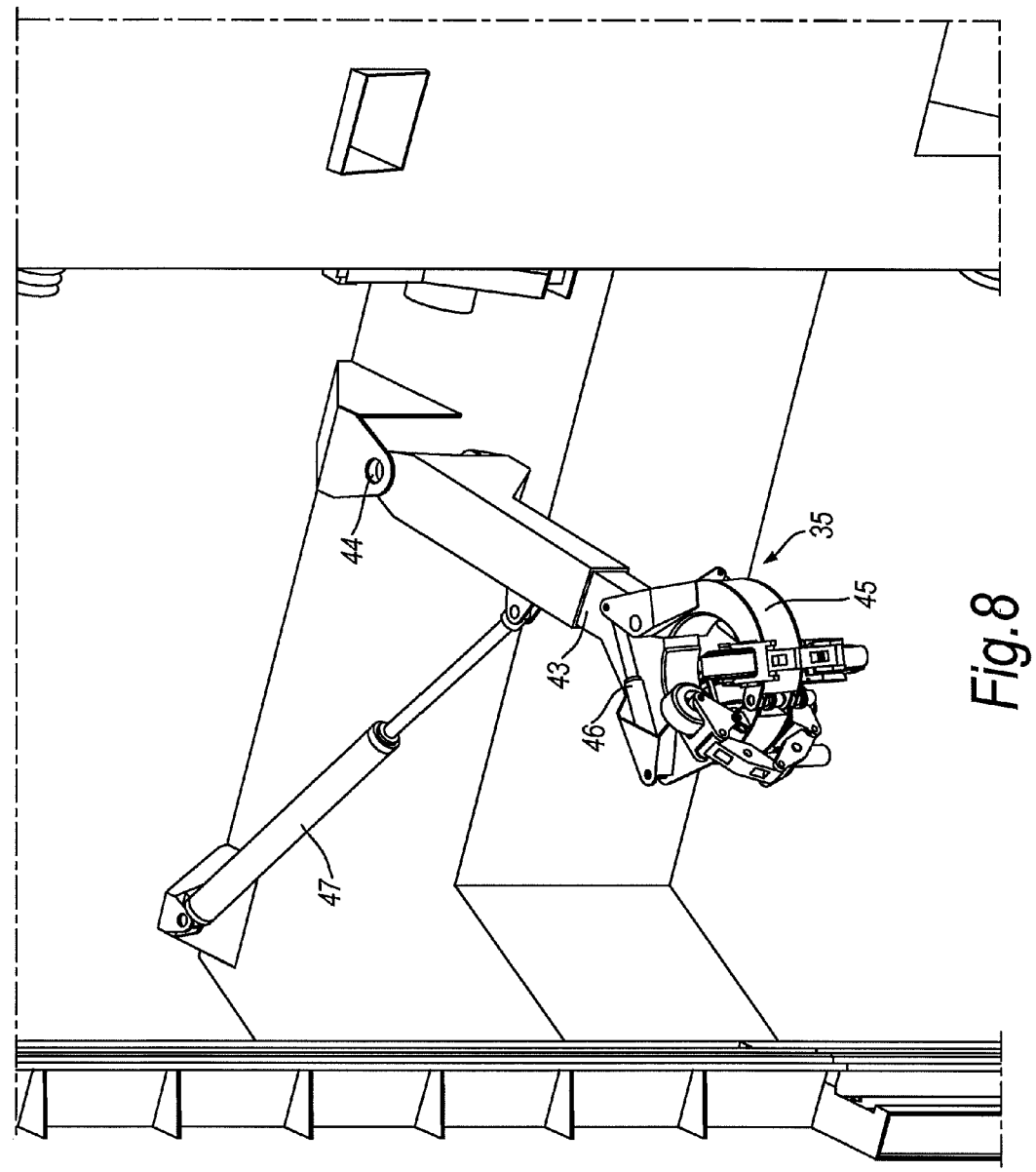
FIG. 8 is a perspective view, from the port side and from the bow end, of a second line-up clamp and mounting system for the clamp.
Figure 9:
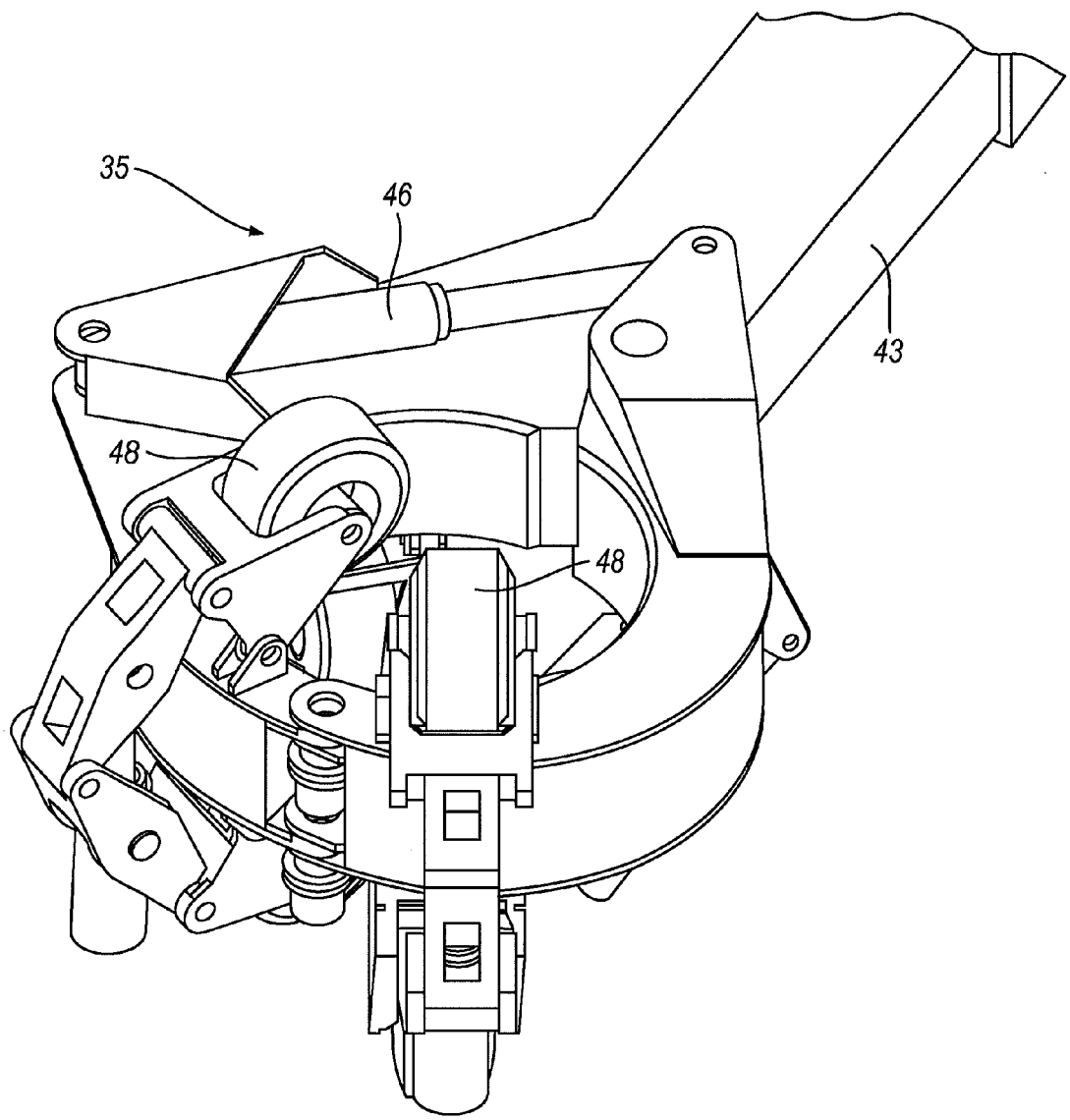
FIG. 9 is a perspective view to a larger scale than FIG. 8, from the starboard side and from the bow end, of the second line-up clamp.
Figure 10:
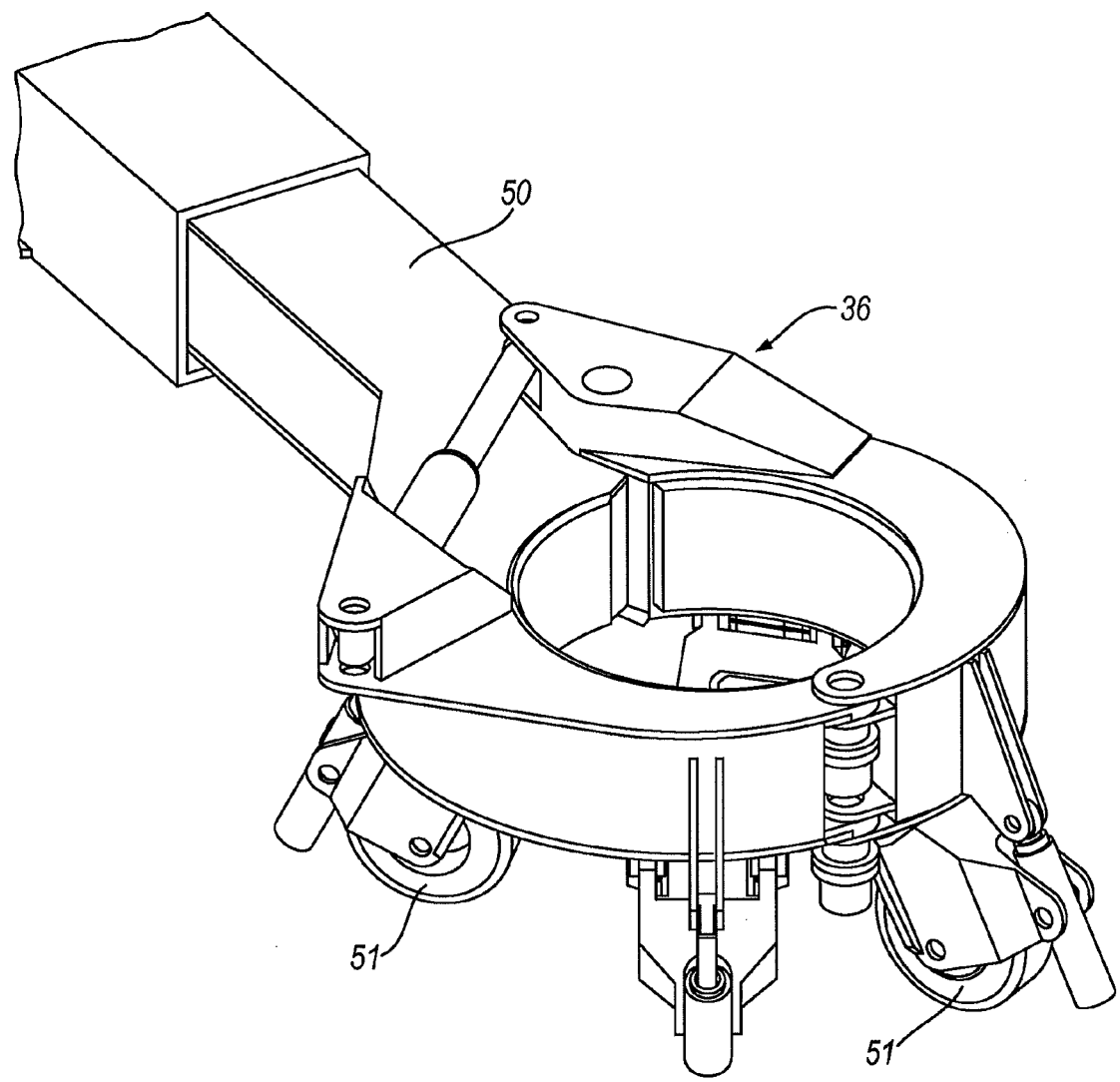
FIG. 10 is a perspective view, from the starboard side and from the bow end, of a third line-up clamp.

The second line-up clamp 35, shown in FIGS. 8 and 9, is carried on an extensible arm 43 that is pivotally mounted at pivot 44 for pivoting movement about an axis parallel to the longitudinal axis of the tower 2. Pivoting movement of the clamp 35 is controlled by a hydraulic cylinder 47. Like the line-up clamp 33, the clamp 35 has a pivotally mounted jaw 45 movable between a closed position, shown in FIGS. 8 and 9, and an open position by a hydraulic cylinder 46. The clamp 35 differs from the clamp 33 in that the clamp 35 allows longitudinal movement of the pipe string 10 through the clamp and for this purpose a plurality of angularly spaced rollers 48 are provided which are resiliently pressed against the pipe string 10 but are able to allow the passage of the pipe string 10, including for example the welded joints of a string comprising four pipe lengths (a quadruple string). The rollers 48 are also hydraulically retractable away from the pipe-laying path.

The third line-up clamp 36 shown in FIG. 10 is of similar construction to the second line-up clamp 35 and operates in a similar way. The clamp 36 is carried on an extensible arm 50 that is pivotally mounted on the tower in a similar manner to the second line-up clamp 35. The clamp 36 allows longitudinal movement of the pipe string 10 through the clamp and for this purpose a plurality of angularly spaced rollers 51 are provided which are resiliently pressed against the pipe string 10 but are able to allow the passage of the pipe string, including for example welded joints. The rollers 51 are also retractable away from the pipe-laying path.

In addition to the clamp system described above, the tower 2 is also provided, at its lower end, with a lower clamp assembly 60 which is able to engage the upper end of the pipeline to which the pipe string 10 is to be joined. The lower clamp assembly 60 is mounted on a framework 61 at the bottom of the tower below the axis of pivoting of the tower 2 on the mounting arms 4P and 4S as shown for example in FIGS. 1, 3 and 11. The lower clamp assembly includes both a collar clamp 62 and a second friction clamp 63 and each of the clamps is independently retractable out of the pipelaying path. Each of these clamps is commonly referred to as a "fixed clamp" or a "hang-off clamp".

Figure 12:
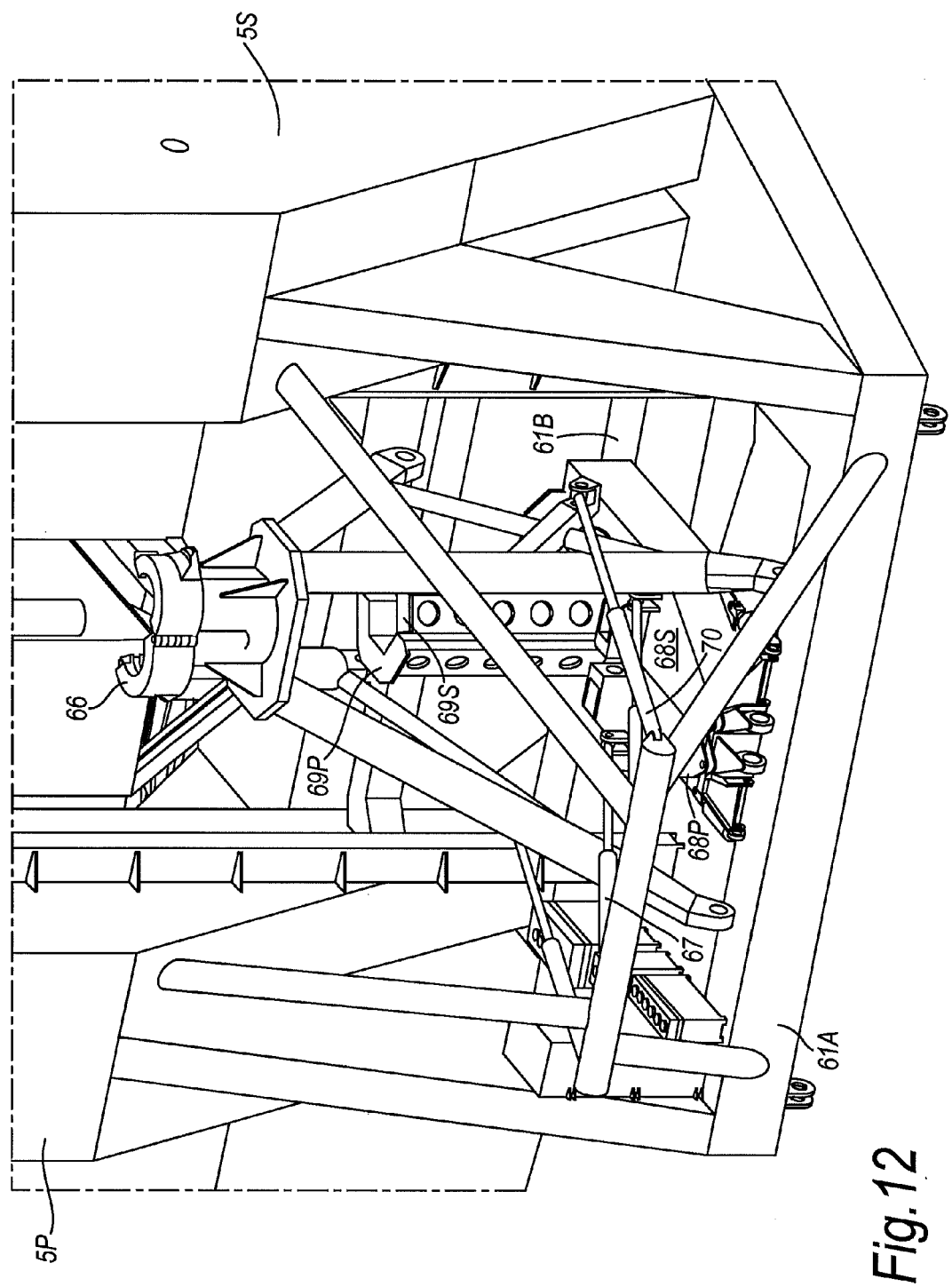
FIG. 12 is a perspective view, from the starboard side and from the stern end, of the lower clamp assembly with the collar clamp in its operative position.
Figure 13:
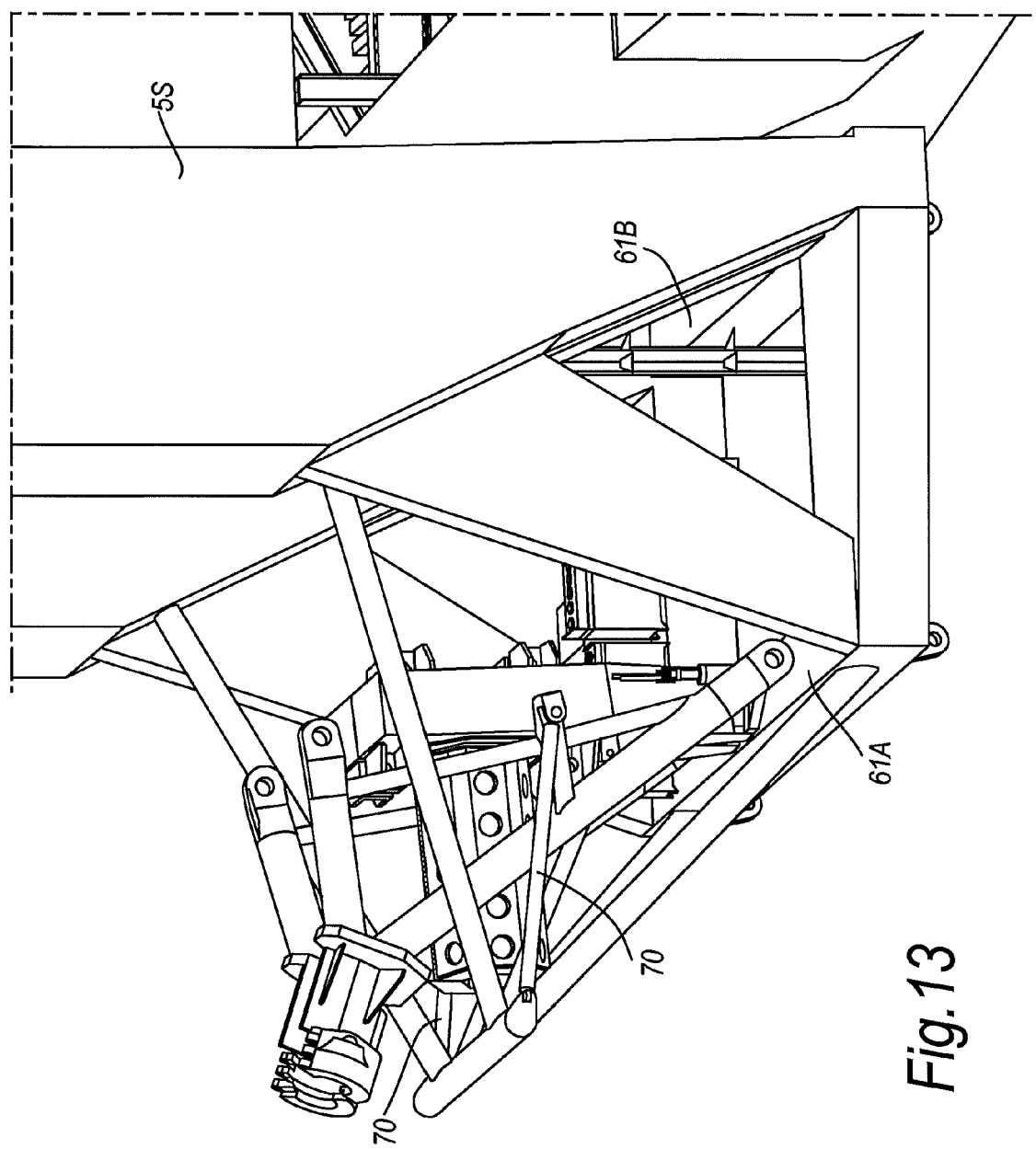
FIG. 13 is a side view from the starboard side of the lower clamp assembly with both the second friction clamp and the collar clamp retracted.

The collar clamp 62 is supported on two rear legs 64 and two front legs 65. The rear legs 64 are pivotally mounted on a horizontal beam 61A of the framework 61 and the front legs 65 are detachably secured to the framework 61. Thus, with the front legs 65 detached, the collar clamp can be retracted to the position shown in FIGS. 11 and 13. A pair of hydraulic cylinders 67 are provided to effect the pivoting movement of the legs. The collar clamp 62 may itself be of a design known per se and may be provided with a hydraulically actuated jaw 66 shown in an open position in FIGS. 11 to 13.

The second friction clamp 63 comprises both a table portion 68 and clamp portion 69 upstanding therefrom. Both the table portion 68 and the clamp portion 69 are split into two halves 68P, 68S and 69P, 69S, with the plane of the split being a vertical plane containing the longitudinal axis of the vessel. The ability of the clamp 63 to split enables the pipeline to pass freely through the second friction clamp even if it is not retracted and even allows a bulky item to pass through the second friction clamp. The clamp portion 69 of the second friction clamp 63 may be of a design known per se and may for example include friction pads pressed by hydraulic pressure against the pipeline.

Figure 11:
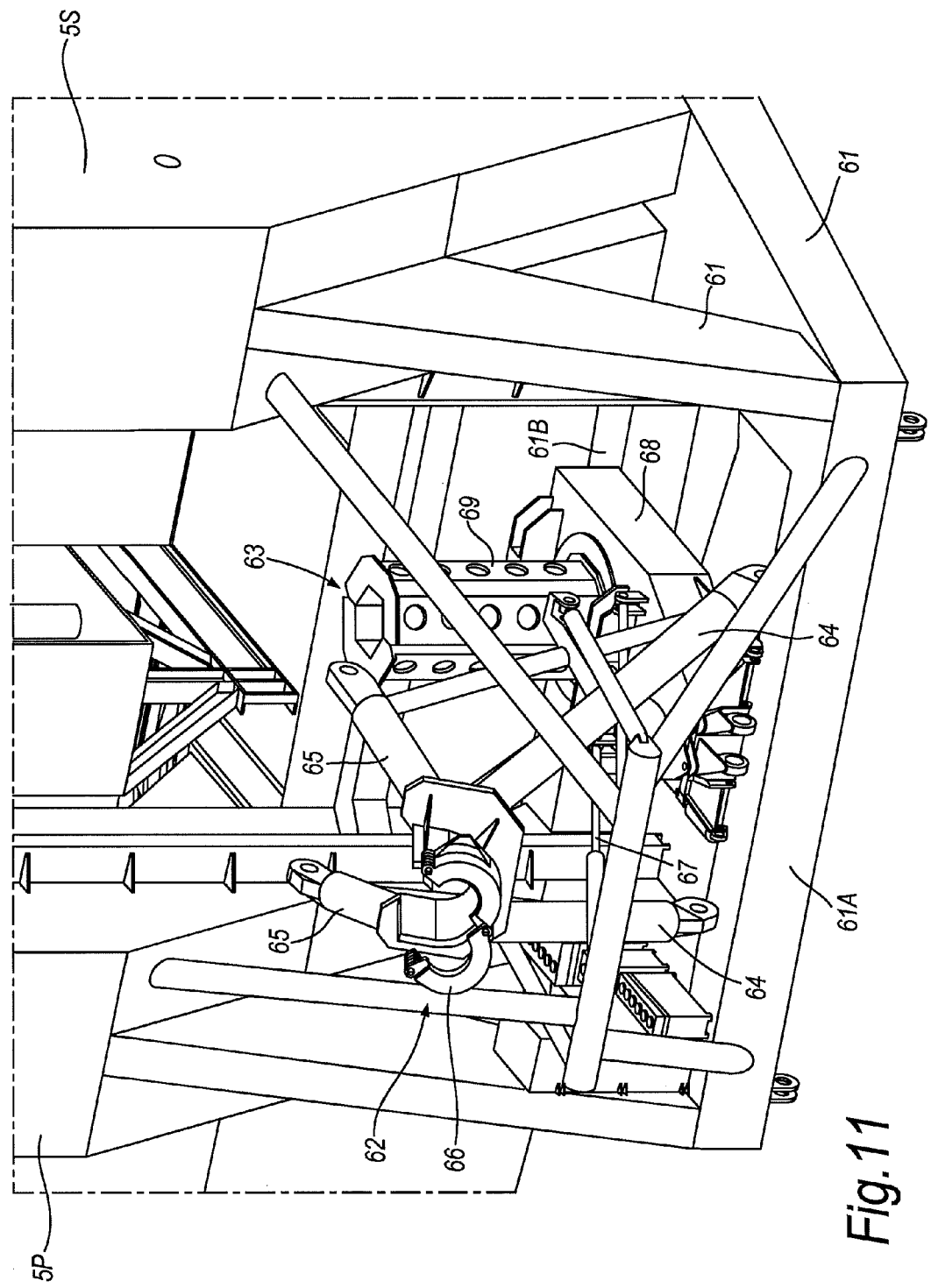
FIG. 11 is a perspective view, from the starboard side and from the stern end, of a lower clamp assembly mounted on the tower comprising a second friction clamp and a collar clamp, with the collar clamp shown retracted.

The table portion 68 of the second friction clamp 63 is pivotally connected at its rear end to the horizontal beam 61A and is supported vertically by that beam and another beam 61B on the opposite side of the pipelaying path. A pair of hydraulic cylinders 70 are provided for pivoting the table portion 68, and therefore the entire second friction clamp 63, between its operative position shown in FIGS. 11 and 12 and a retracted position shown in FIG. 13. In normal operation, the second friction clamp 63 is in its operative position and the collar clamp 62 is retracted, as shown in FIG. 11.

A safety clamp (not shown) may be provided within the table portion 68. Such a clamp can be used to grip the pipeline in the event of any slippage through the lower clamp assembly being detected. Thus the safety clamp can provide a contingency system.

Figure 14:
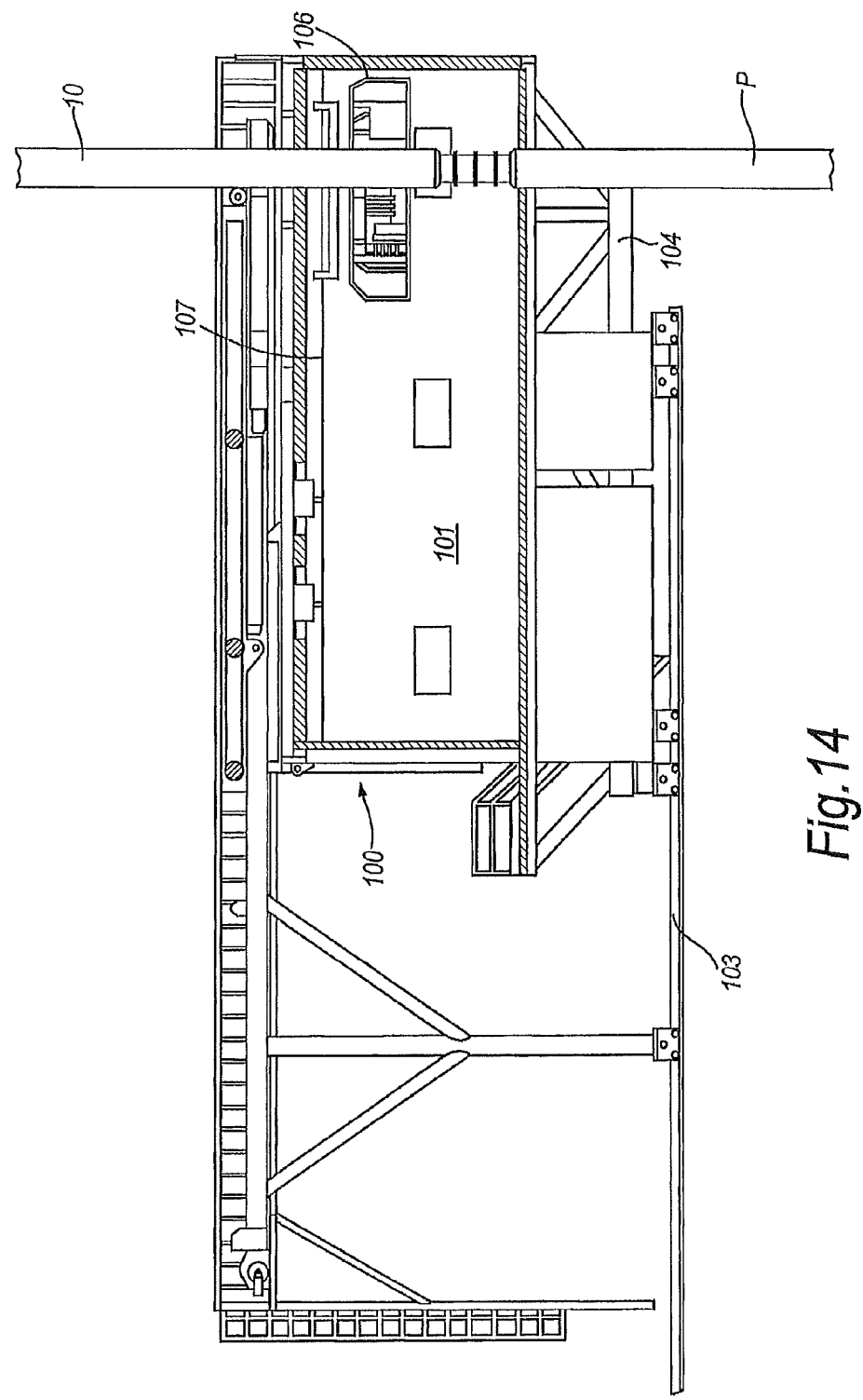
FIG. 14 is a side sectional view from the port side of an assembly station provided on the vessel.

The vessel is provided with a welding assembly station 100 at which pipeline assembly operations are carried out. The assembly station 100 generally comprises a cabin 101 which is slidably mounted by wheels 102 on rails 103 provided on the deck 6 as shown for example in FIGS. 14 and 16. The cabin 101 can thereby be driven between an operative position shown in FIG. 14 in which the pipeline path passes through the cabin and a retracted position, shown for example in FIG. 2, in which the cabin 101 is clear of the pipeline path. As shown in the drawings the cabin is supported on a frame 104 which serves to raise the floor of the cabin to a level such that the height within the cabin for the joint (field joint) of the bottom of a pipe string to the top of a pipeline is at the level of the axis of pivoting of the tower 2 on the mounting arms 4P and 4S. By arranging for that axis of pivoting to pass through the location of the joint of the new pipe string with the existing pipeline, it becomes much easier to operate across a range of inclinations of the tower 2. For example, whilst FIG. 14 shows a pipe string 10 being joined to the top of a suspended pipeline P with the tower 2 vertical, FIG. 17 shows the junction being made with the tower 2 at an angle of 45 degrees to the horizontal and it can be seen that the location of the joint is still within the cabin.

Figure 15:
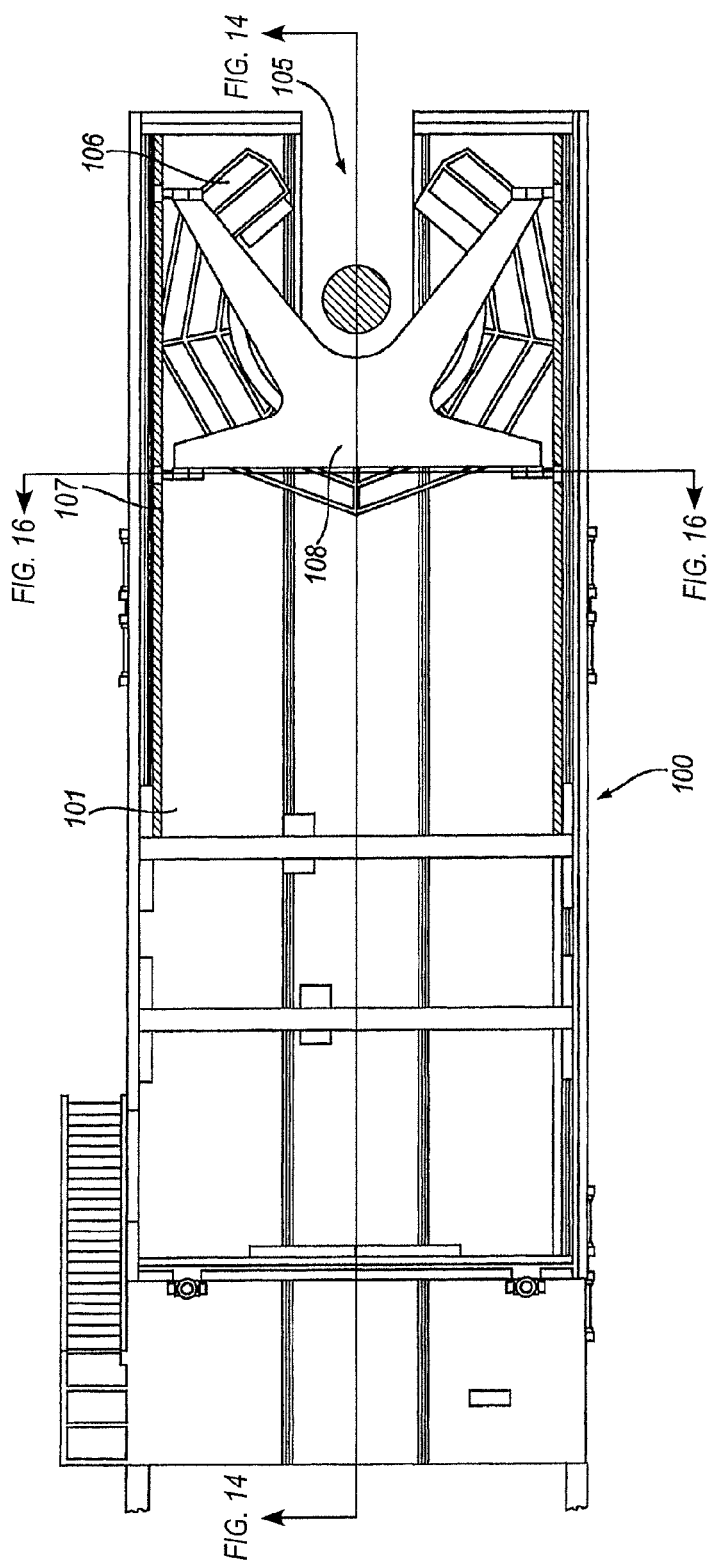
FIG. 15 is a sectional plan view of the assembly station.
Figure 16:
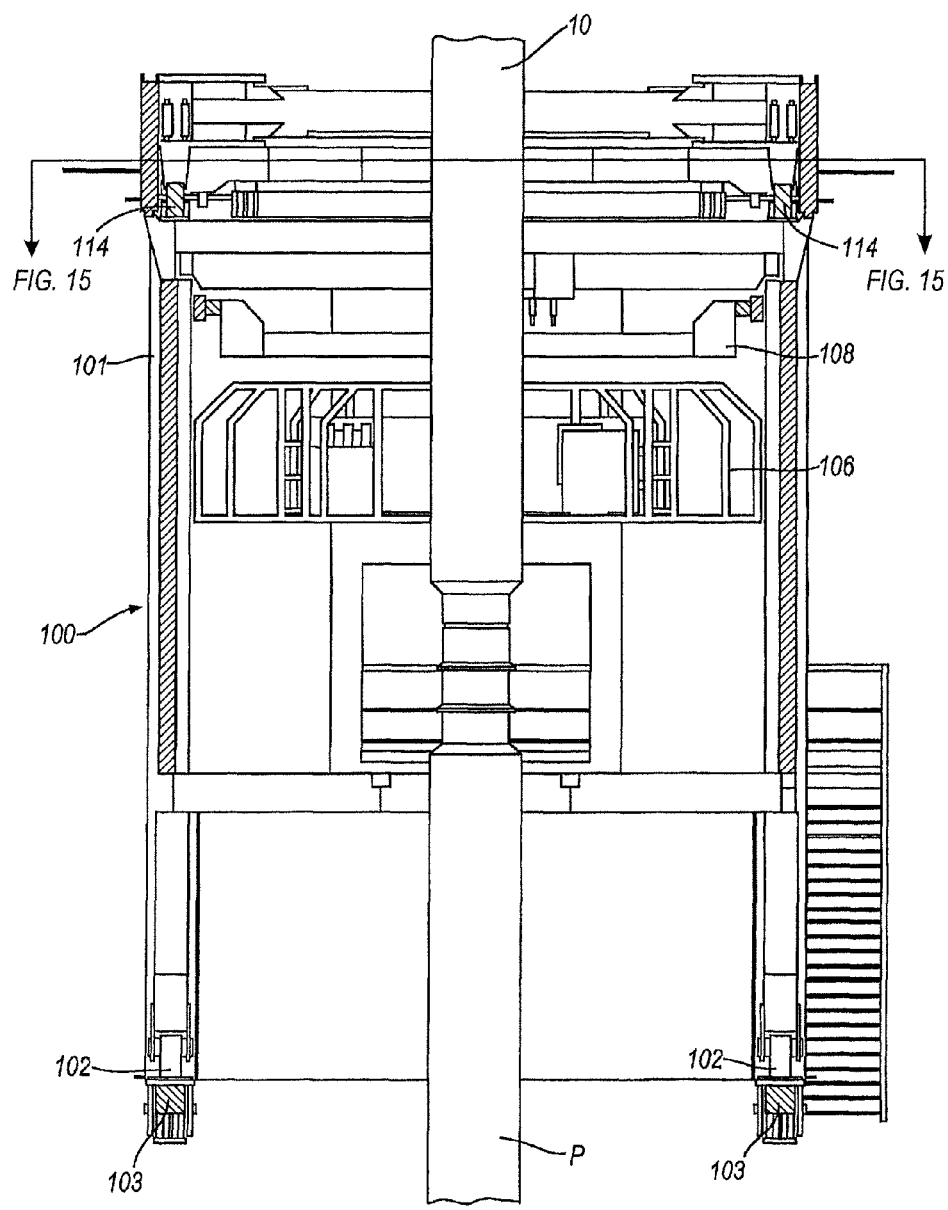
FIG. 16 is a sectional end view from the stern of the assembly station.
Figure 17:
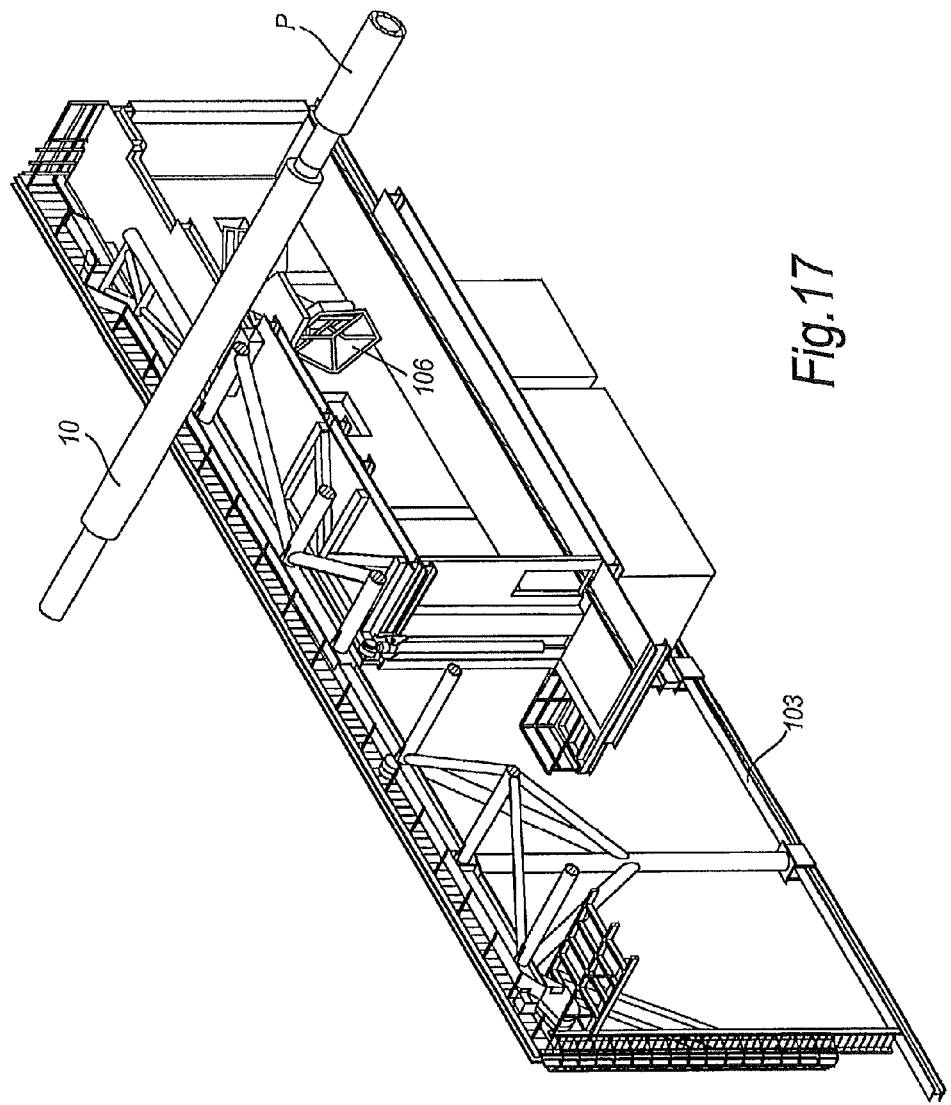
FIG. 17 is a sectional perspective view, from the port side and the bow end, of the assembly station.

As shown in FIGS. 14 to 17, the aft end wall of the cabin and portions of the roof and floor of the cabin are cut away to form a central end slot 105 in which the pipeline can be accommodated as the cabin is moved from its retracted position to its operative position. Mounted inside the roof of the cabin is a carousel 106 carrying equipment for use in welding the pipe string 10 to the pipeline P. The carousel may be a horseshoe shape to facilitate its introduction around the pipe-laying path and may be as described in U.S. Pat. No. 6,313,426, the description of which is incorporated herein by reference. An overhead crane 108, diagrammatically shown in FIGS. 15 and 16 is provided in the top of the cabin 101 and runs on rails 107 extending along the length of the cabin. Other rails, not shown, may also be provided on the floor of the cabin, extending from the aft end of the cabin, which may be openable, to each side of the location of the field joint.

The portion of the end slot 105 in the aft end wall of the cabin and the portions of the slot 105 in the roof and floor of the cabin have associated closure members (not shown) to enable the slot 105 to be closed over after movement of the assembly station between its retracted and operative positions. Thus the cabin is weatherproof except when it is being used.

The vessel is also equipped with a handling system for enabling bulky items to be included along the pipeline when required. Bulky items such as valve blocks and Pipe Line End Manifolds (PLEMS) are sometimes required to be laid and it is desirable that their laying should not unduly disrupt or delay the pipelaying. The handling system for handling bulky items generally comprises an extension frame 110 and a tilting frame 111, shown, for example, in FIG. 18. The extension frame 110 includes a pair of legs 112 carrying wheels at their bottom ends that engage the rails 103 on which the cabin 101 is also mounted. The extension frame also includes a pair of longitudinal beams 113 that extend horizontally towards the stern of the vessel, being supported at their bow ends by the legs 112 and at their stern ends carry wheels which engage rails 114 on the roof of the cabin 101. In that way the extension frame 110 is able to move along the deck 6 of the vessel and can move in unison with the cabin 101, but also independently of the cabin 101.

Figure 18:
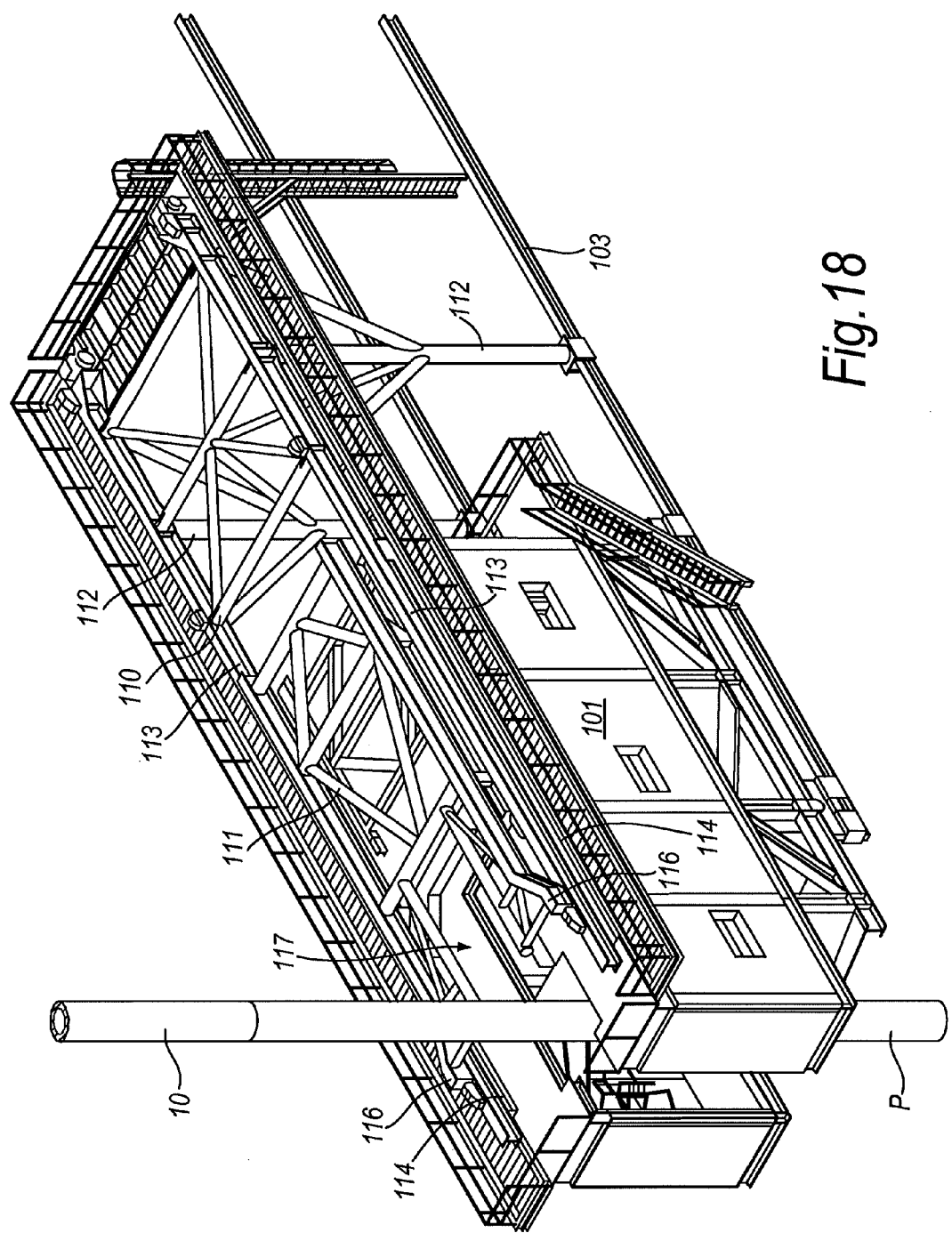
FIG. 18 is a perspective view, from the starboard side and from the stern end, of the assembly station and a handling system for handling bulky items.

The tilting frame 111 is mounted over the extension frame 110 and is pivotally connected at its stern end to the extension frame at locations indicated by reference numeral 116. In a preferred arrangement the locations 116 can be adjusted to facilitate operations at different tower angles and/or for different shapes of bulky item. One or more hydraulic cylinders 300 are provided for tilting the tilting frame 111 relative to the extension frame. As can be seen in FIG. 18, the stern end of the tilting frame incorporates a slot 117 which overlies an open ended part of the extension frame 110. In FIG. 18, the extension frame 110 and tilting frame 111 are shown in their most forward (advanced towards the pie-laying path) positions relative to the cabin 101, but during normal operation when no bulky item is being added to the pipeline the extension frame 110 and tilting frame 111 are in the position shown in, for example, FIG. 14. The slot 117 in the tilting frame 111 and the open end of the extension frame 110 allow free passage of the pipe string 10, even when the tower is tilted to an angle of 45 degrees.

The sequence of operations involved in a cycle of adding one pipe string 10 to the pipeline P will now be described, taking first the case of an ordinary cycle of operations. Thereafter special cycles of operations will be described, including one in which a bulky item is added to the pipeline.

An ordinary cycle of operation will be described starting from the position where the loading arm 9 has just been raised into the tower 2 and locked thereto and the pipeline P has just been lowered with a new pipe string added thereto and the travelling block 30 is at the bottom of the tower 2 above the lower clamp assembly 60. The second friction clamp 63 is closed holding the tension in the pipeline P and the collar clamp 62 is in its retracted position. At this stage the cabin 101 has been moved forwards away from the tower.

The travelling block 30 is first raised to the top of the tower 2 and the clamps 11 and the loading arm 9 are rotated to load a new pipe string 10 into the pipelaying path (firing line) in the tower 2. At the top of the tower 2, is an internal line-up system 75, including a winch and an internal line-up clamp which is lowered inside the new pipe string in a manner known per se.

The line-up clamps 35 and 36 are in a retracted position away from the firing line as the travelling block is moved up the tower. As soon as the travelling block passes each of the clamps 35, 36, they are deployed into their operative positions. When the clamps 11 on the loading arm 9 are moved round as the loading arm 9 is rotated, the new pipe string is introduced into the clamps 33, 35 and 36 which are then closed around the new pipe string 10 the clamp 33 also being in its operative positions by this time. The line-up clamp 33 bears the weight of the new pipe string 10. The clamps 11 are then opened, releasing the new pipe string from the loading arm 9.

The cabin 101 is then moved rearwardly towards the tower and the top of the pipeline P and the bottom of the new pipe string 10 received within the cabin 101, entering through the slot 105 in the cabin, the slot being closed after the cabin 101 has reached its final position. The precise position of the new pipe string 10 can then be adjusted to move it into exactly the position required for welding to the pipeline P. The longitudinal position of the pipe string 10 along the tower 2 can be adjusted by movement of the travelling block and the lateral position of the pipes relative to the firing line can be adjusted in both orthogonal directions by the line-up clamps, and the internal line-up clamp. It will be understood that the line-up clamps 35, 36 allow free longitudinal movement of the pipe string 10 through them but are able to apply appropriate transverse loads to deform the pipe string 10 if necessary and line it up.

Once the pipe string 10 is correctly positioned it is welded to the pipeline P and Non-Destructive Testing (NDT) and coating steps also carried out on the joint. The internal line-up clamp is then raised, the line-up clamp 33 opened and then retracted and the first friction clamp 34 on the travelling block 30 closed to grip the top of the pipe string 10.

The pipeline path (firing line) passes through the axis of pivoting, of the tower 2 on the mounting arms 4P, 4S, and the position of the field joint between the new pipe string 10 and the pipeline P is on that axis. Thus the position of the field joint does not change as the tower is pivoted.

When the first friction clamp 34 is fully engaged with the top of the pipe string 10, the second friction clamp 63 is opened so the pipeline is then suspended from the first friction clamp 34. The travelling block 30 is then lowered and at the same time the cabin 101 is moved forwards away from the tower so that the travelling block 30 is able to be lowered by the main winch 38 to the level of the field joint. As the travelling block 30 is lowered each of the line up clamps 35, 36 are retracted to allow passage of the travelling block 30. Once the travelling block has reached a position in which the top of the pipe string 10 is at the location of the top of the pipeline P at the beginning of the cycle, the travelling block 30 stops and the second friction clamp 63 is closed on the pipeline P and takes the tension load of the pipeline. When the second friction clamp 63 is fully engaged with the pipeline P, the first friction clamp 34 is opened releasing the load from the travelling block.

After the clamps 11 on the loading arm 9 are opened, releasing the pipe string 10 from the loading arm 9, the fastening of the loading arm to the girder 5P is released and the winch 14 operated to lower the loading arm down to its horizontal position on the deck 6. A new pipe string 10 is then loaded onto the loading arm, being held by the clamps 11 which have been rotated back to their position at the beginning of the cycle and the loading arm then raised by the winch 14 back to a position adjacent the girder 5P and fastened thereto. The lowering and raising of the loading arm 9 takes place in parallel with the welding of the pipe string to the pipeline and the lowering of the pipeline so that the new pipe string is ready to be rotated into position along the firing line once the travelling block 30 has been lowered.

In the sequence of operations described above, the second friction clamp 63 is used and not the collar clamp 62. In an alternative procedure, the second friction clamp 63 is retracted and the collar clamp 62 is pivoted into its operational position. The collar clamp 62 is then opened and closed at the same times as the second friction clamp 63 in the sequence of operations described above. As will be understood, the collar clamp 62 holds the pipeline P by engaging the underside of a collar formed on the pipeline P and, when it is used, each new pipe string 10 is provided with a collar at the appropriate position for engagement by the collar clamp 62.

A vessel of the kind described above can be designed to accommodate very high pipeline tension loads, enabling it to operate in very deep water. For example, the vessel may be able to lay pipeline while accommodating a tension load in the tower of over 1,000 tonnes. The second friction clamp 63 and/or the collar clamp 62 may be able to accommodate a tension load of over 1,500 tonnes (in a preferred embodiment 2,000 tonnes) and the travelling block and the first friction clamp 34 may be able to accommodate a tension load of over 1,000 tonnes (in a preferred embodiment 1,500 tonnes) during operation.

If the vessel is to operate with the tower 2 at an angle of more than 90 degrees to the horizontal, then it may be necessary to provide an additional facility to control movement of the loading arm 9 beyond a 90 degree angle. Such a facility may for example be provided by an additional winch which would only be required to handle the low loads needed to control movement of the loading arm 9 in the region of a vertical position.

As is already known for pipe-laying vessels, the vessel is also equipped with appropriate equipment to enable the pipeline P to be abandoned from and recovered to the vessel.

If a bulky item is to be added to the pipeline P, the loading arm 9 is not used to load the bulky item but, instead the handling system including the extension frame 110 and the tilting frame 111 are used in a manner that will now be described with reference to FIGS. 19 to 23.

Figure 19:
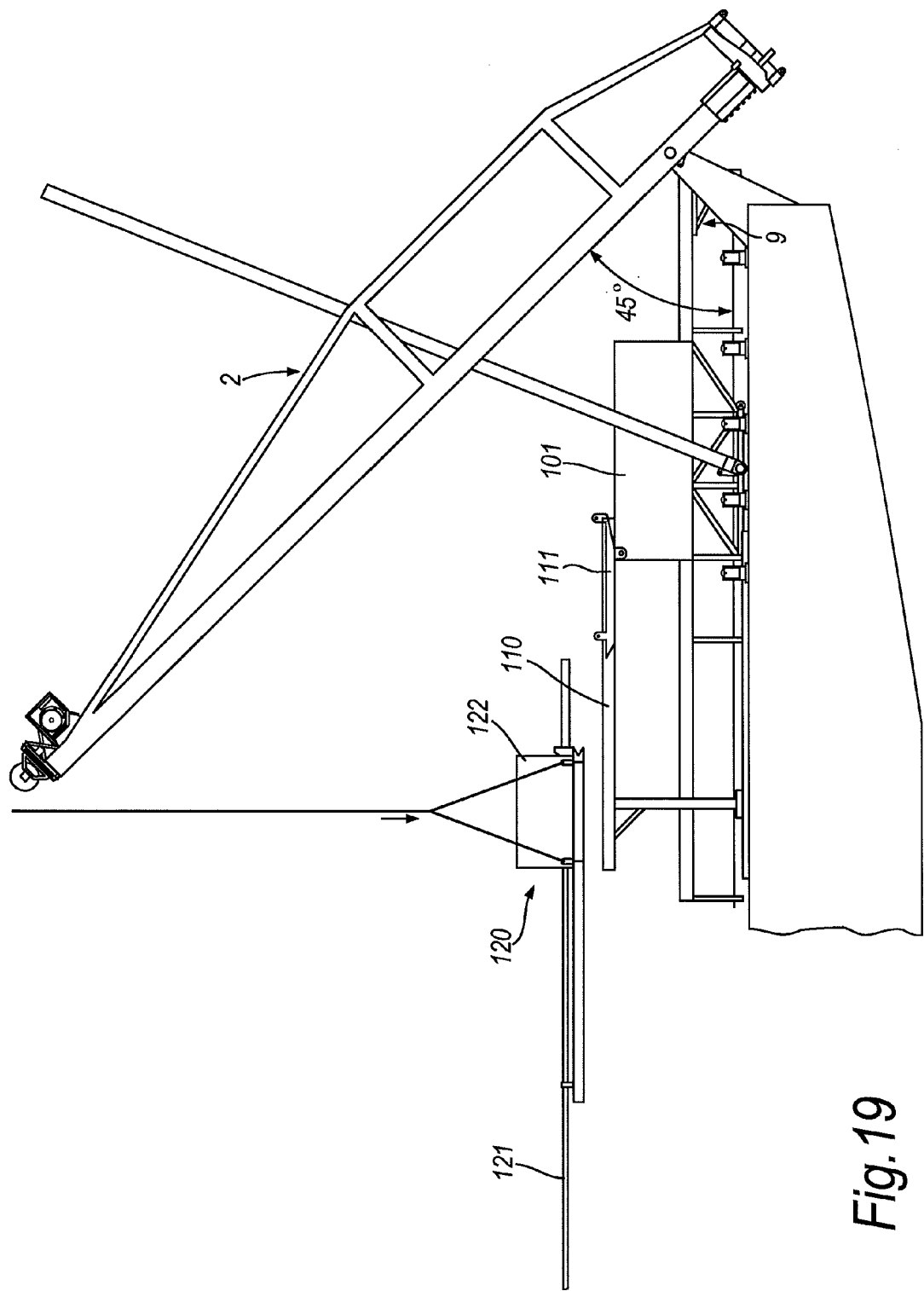
FIG. 19 is a diagrammatic side view showing a first step in a procedure for connecting a bulky item to the pipeline.
Figure 20:
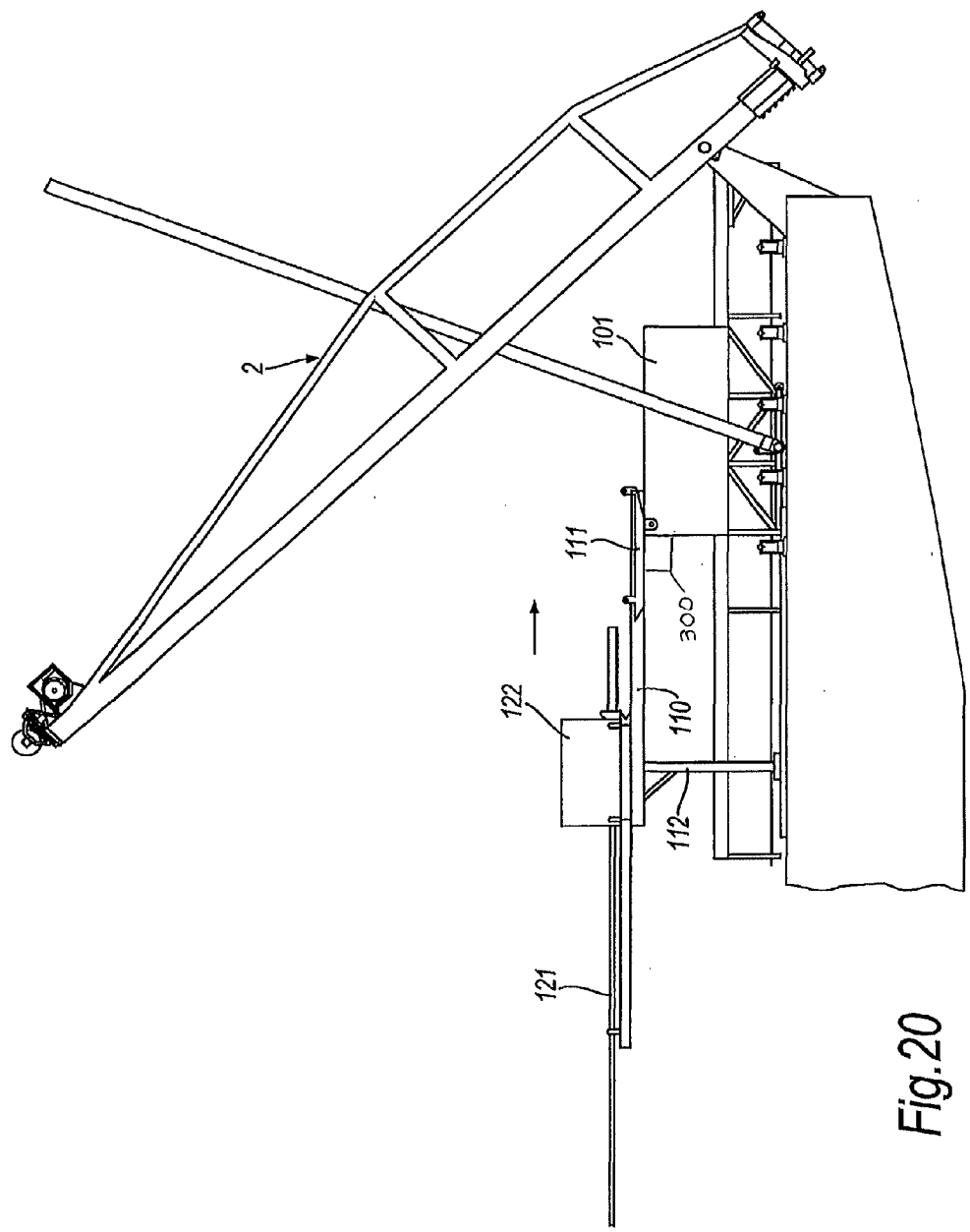
FIG. 20 is a diagrammatic side view showing a second step in the procedure.

With the cabin 101 in its forward position clear of the tower 2 and with the extension frame 110 in its forward position as shown in FIG. 19, a bulky item assembly 120, comprising in this example a quadruple pipe string 121 incorporating a bulky item 122 shown as a box shape is loaded by a crane, for example the crane 3, onto the extension frame 110 leaving the parts in the positions shown in FIG. 20.

Figure 21:
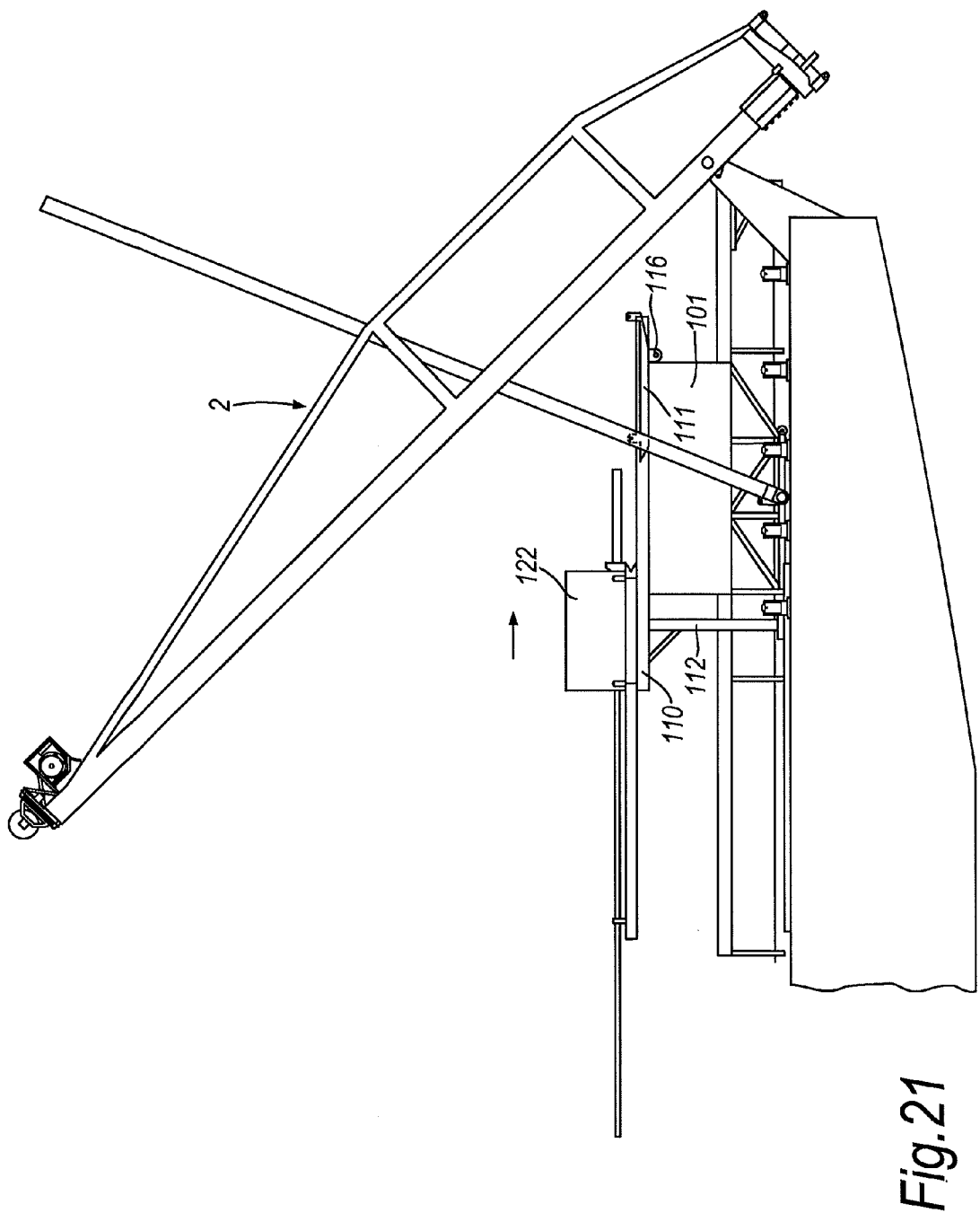
FIG. 21 is a diagrammatic side view showing a third step in the procedure.

The extension frame 110 (and therefore also the tilting frame 111 and the bulky item assembly 120) is then moved aft to the position shown in FIG. 21, with the wheels on the legs 112 travelling along the rails 103 and the wheels on the stern ends of the beams 113 of the extension frame 110 travelling along the rails 114 on the roof of the cabin 101. That brings the parts into the positions shown in FIG. 21. The extension frame 110 is then fastened to the cabin 101.

Figure 22:
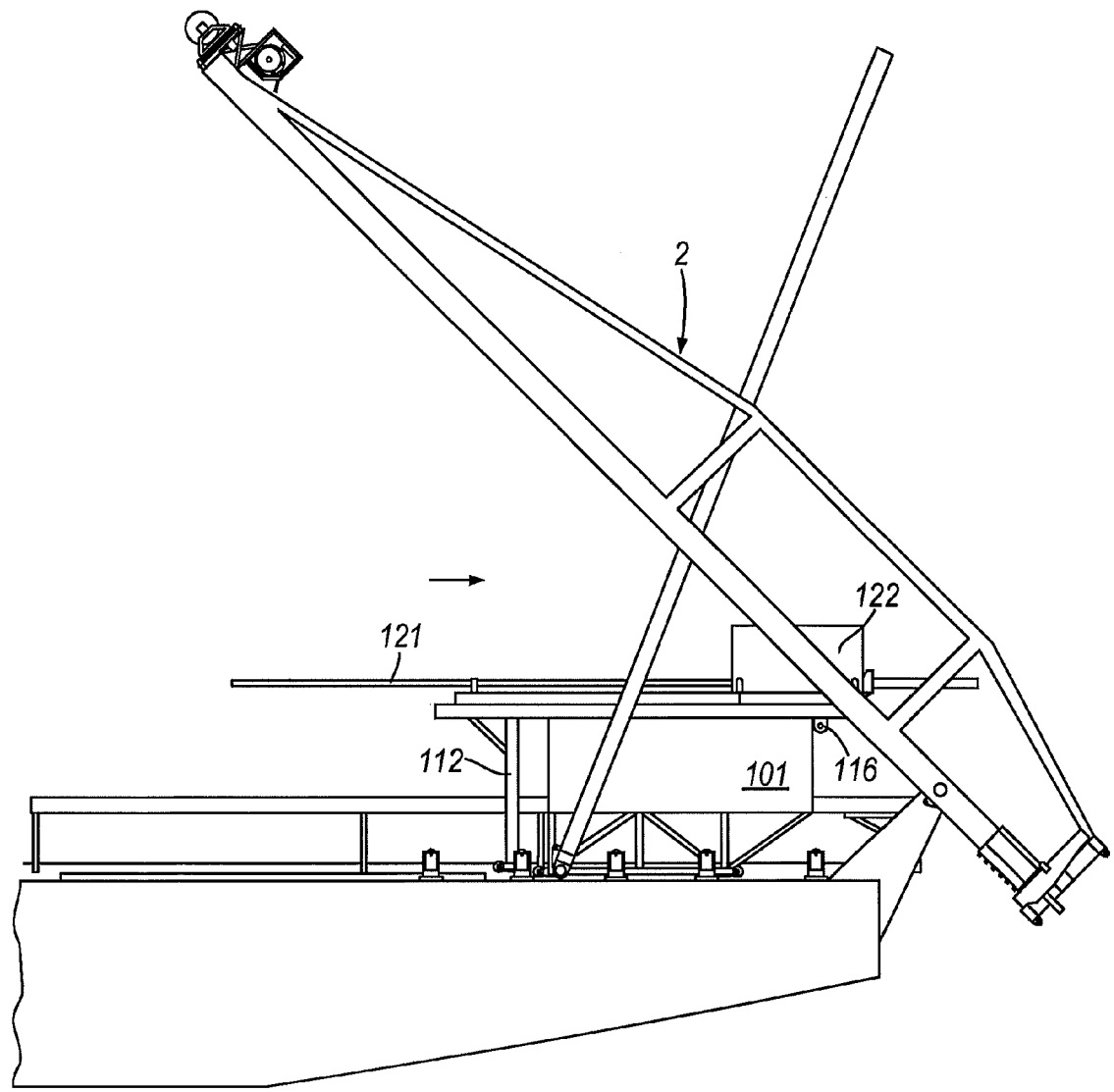
FIG. 22 is a diagrammatic side view showing a further step in the procedure.
Figure 23:
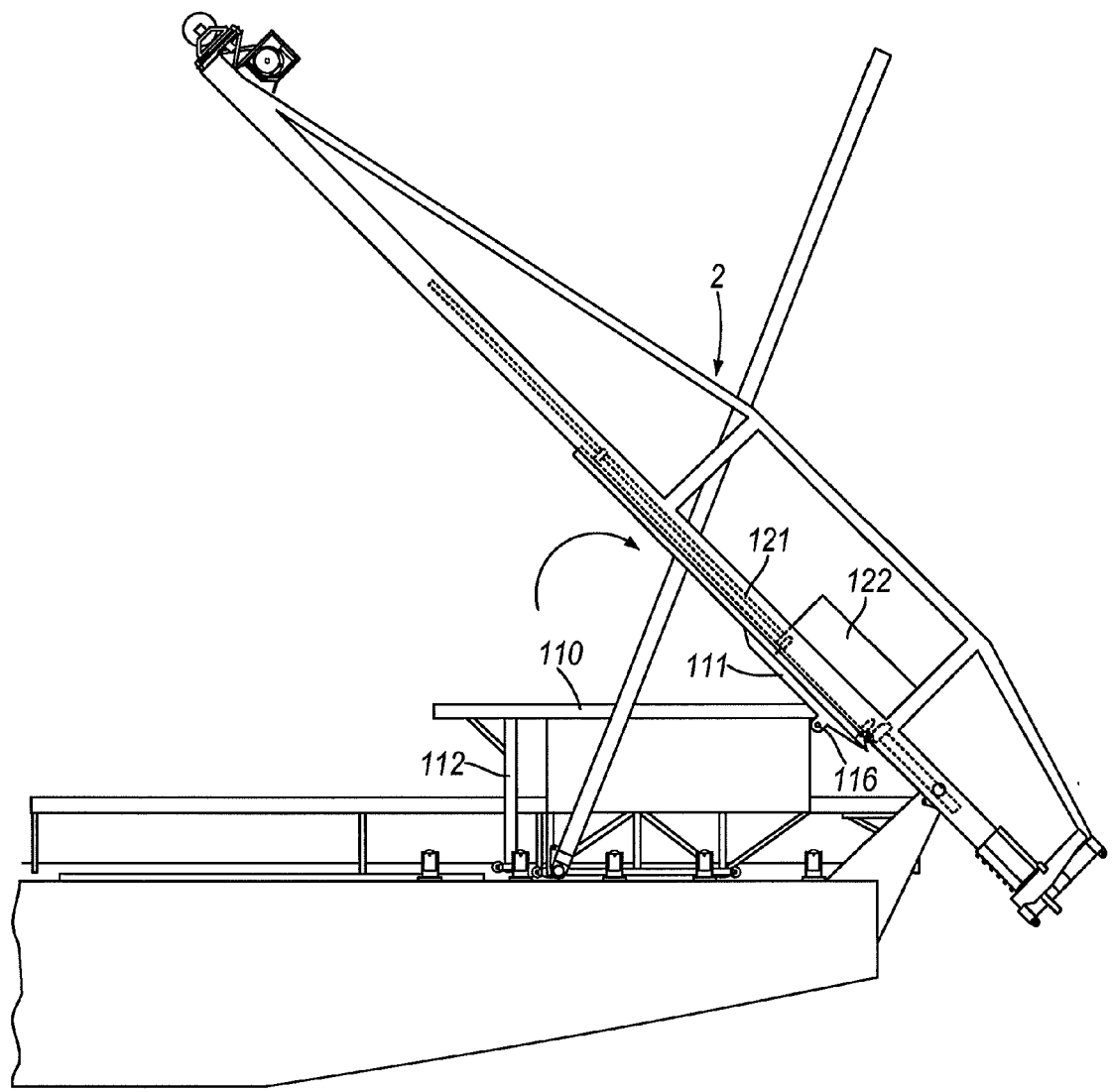
FIG. 23 is a diagrammatic side view showing a fifth step in the procedure.

The cabin is then moved aft to the position shown in FIG. 22 taking the extension frame 110, the tilting frame 111 and the bulky item assembly 120 with it. Also, the bulky item assembly 120 is skidded along the extension frame 110 to lie over the tilting frame 111 and is secured to it. As can be seen from FIG. 22 the cabin 101 is moved far enough aft that the pivot locations 116 are close to the pipelaying path in the tower 2.

The tilting frame 111 is then tilted about the extension frame 110 at the pivot locations 116 using the hydraulic cylinders until the tilting frame 111 extends parallel to the tower 2. In this position the pipe string 121 is disposed along the normal pipestring path within the tower 2 and the pipe string 121 can be engaged by the line-up clamps 33, 35 and 36, in substantially the same manner as the pipe string 10. Also the bulky item 122 may engage the rails on the girders 5P, 5S of the tower 2.

Once the pipe string 121 is securely held in the tower 2, the fastening to the tilting frame 111 is released and the tilting frame returned to its horizontal position on the extension frame 110. The cabin 101 can then be moved further aft and, if necessary, the bulky item lowered a short distance down the tower to bring the field joint between the bulky item assembly 120 and the pipeline to the usual location in the cabin 101. Once the various operations associated with making the field joint are complete, the cabin can be retracted towards the bow of the vessel, the pipe string 121 can be engaged by the first friction clamp 34 on the travelling block 30, the line-up clamps 33, 35 and 36 can be opened and retracted, the second friction clamp 63 can be released and split into its two halves and the pipeline with the bulky item assembly 120 now defining its upper end lowered by the travelling block 30 down to the usual lower position of the travelling block 30 at the level where the field joint is made. The second friction clamp 63 can then be returned to its normal unsplit position and operated to grip the upper end of the pipe string 121 with the bulky item 122 now deployed in the water clear of the clamp 63.

The description above of the operation of the bulky item handling system has been provided for the case where the tower 2 is inclined at an angle of about 45 degrees to the horizontal but it will be understood that the operation can be carried out in the same way for steeper angles of the tower 2, including the case where the tower is vertical.

In the procedure described immediately above, the bulky item assembly 120 is first placed towards the bow end of the extension frame 110 and is then skidded onto the tilting frame 111. An alternative possibility is to place the assembly 120 in its final position on the tilting frame 111 at the outset.

Whilst one particular form of vessel has been described above with reference to the drawings, it will be understood that many modifications may be made to that embodiment and some of these modifications are mentioned below.

In the described embodiment a travelling block 30 is provided for lowering the pipeline P into the water, but it should be understood that other systems, for example, using tensioners, may also be employed. Also, in the described embodiment the loading arm 9 is pivotally mounted in the region of the bottom of the tower but an alternative arrangement would be for it to be in the form of a strongback and for the end of the loading arm nearer to the tower when the arm is horizontal to be raised up the tower. Furthermore, in the described embodiment, the tower is able to operate at a range of angles but it is also possible for the tower to be fixed, for example, in a vertical position. In FIGS. 3 and 4, the tower 2 is shown with a stinger 80 at its bottom, this being an option (usually preferred). The construction of the stinger 80 may be of a kind known per se.

Where in the foregoing description, integers or elements are mentioned which have known, obvious or foreseeable equivalents, then, such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A pipe-laying vessel comprising a deck and a tower extending upwardly from the vessel, a pipe loading arm for raising a length of pipe from the deck to a position aligned with the tower, a support assembly for supporting a bulky item to be accommodated along the pipeline, the support assembly including a tiltable frame pivotable between a first load receiving position and a second tilted position in which the frame extends approximately parallel to the tower, and a drive mechanism for pivoting the tiltable frame between the first and second positions and wherein the vessel further includes a welding assembly station cabin in a region of a lower portion of the tower, the support assembly being disposed on top of the cabin, and wherein at least part of the support assembly rests on and is supported by the cabin.

2. The vessel according to claim 1, in which the tiltable frame extends approximately horizontally when in the first load receiving position.

3. The vessel according to claim 1, in which the support assembly is a movable support, including the tiltable frame, which is pivotally mounted.

4. The vessel according to claim 3, in which the movable support assembly is movable towards and away from the tower.

5. The vessel according to claim 1, in which the cabin is movable towards and away from the tower.

6. The vessel according to claim 5, in which the support assembly is movable in unison with the cabin.

7. The vessel according to claim 5, in which the support assembly is movable independently of the cabin.

8. The vessel according to claim 5, in which the cabin and the support assembly are mounted at least partly on a common set of rails.

9. The vessel according to claim 5, in which the support assembly is mounted at least partly on a set of rails on the roof of the cabin.

10. The vessel according to claim 1, in which the support assembly comprises a first frame, the tiltable frame defining a second frame pivotally mounted on the first frame and pivotable between the first load receiving position and the second tilted position.

11. The vessel according to claim 1, in which the tower is pivotally mounted and is able to operate over a range of angles to the horizontal.

12. The vessel according to claim 1, in which a travelling clamp assembly is mounted for movement along the tower and a fixed clamp assembly is located in the region of the lower portion of the tower.

13. The vessel according to claim 12, in which at least one of the travelling clamp assembly and the fixed clamp assembly includes both a friction clamp and a collar clamp, each of the friction clamp and the collar clamp being movable between an operative position, in which the friction clamp or the collar clamp is adjustable between a clamping and a released position, and an inoperative position.

14. The vessel according to claim 12, in which the travelling clamp assembly includes both a line-up clamp and a pipeline tension bearing clamp.

15. The vessel according to claim 1, including three or more line-up clamps spaced along the tower for receiving the length of pipe from the loading arm.

16. The vessel according to claim 1, in which a rope and winch system is provided for moving the pipe loading arm to raise the length of pipe, the rope and winch system including two ropes operating in parallel whereby movement of the loading arm is still effectable by the system in the event that one of the two ropes is inoperative.

17. The vessel according to claim 1, the tilting frame having an axis of pivoting and in which the axis of pivoting of the tiltable frame is in a region of the tower.

18. A method of laying a pipeline from a pipe-laying vessel, the method comprising the following steps:

providing a vessel with an upwardly extending tower, raising a length of pipe on a pipe loading arm from a deck of the vessel to a position aligned with the tower, welding the length of pipe to an end of a pipeline suspended from the vessel, lowering the pipeline with the length of pipe welded thereto, resting a bulky item to be added to the pipeline on a tiltable frame, the tiltable frame being part of a support assembly, tilting the frame to a position extending approximately parallel to the tower, transferring support for the bulky item from the tiltable frame to one or more devices in the tower, and connecting the bulky item to the pipeline suspended from the vessel, and wherein the welding of the length of pipe to the end of the pipeline is carried out in a welding assembly station cabin disposed in a region of a lower portion of the tower, wherein at least part of the support assembly rests on and is supported by the cabin.

19. The method according to claim 18, in which the tiltable frame extends approximately horizontally when receiving the bulky item.

20. The method according to claim 18, in which the tiltable frame is tilted from a position overlying a top of the cabin to the position extending approximately parallel to the tower.

21. The method according to claim 20, in which the cabin and the tiltable frame are moved towards the tower in unison.

22. The method according to claim 18, further including the step of moving the cabin towards the tower.

23. The method according to claim 18, in which the bulky item is rested on a movable support assembly that includes the tiltable frame, the support assembly is moved towards the tower and the cabin in a first step and is moved in unison with the cabin towards the tower in a subsequent step.

24. A method of laying a pipeline from a pipe-laying vessel, the method comprising providing the vessel as claimed in claim 1, and laying the pipeline from the pipe-laying vessel.

* * * * *